United States Patent
Keramidas et al.

(10) Patent No.: US 9,658,851 B2
(45) Date of Patent: *May 23, 2017

(54) DEVICE AND METHOD FOR APPROXIMATE MEMOIZATION

(71) Applicant: THINK SILICON SA, Patras (GR)

(72) Inventors: Georgios Keramidas, Patras (GR); Iakovos Stamoulis, Patras (GR); Chrysa Kokkala, Patras (GR); George Sidiropoulos, Patras (GR)

(73) Assignee: THINK SILICON SA, Patras (GR)

( * ) Notice: Subject to any disclaimer, the term of this patent is extended or adjusted under 35 U.S.C. 154(b) by 26 days.

This patent is subject to a terminal disclaimer.

(21) Appl. No.: 14/826,556

(22) Filed: Aug. 14, 2015

(65) Prior Publication Data
US 2015/0347139 A1    Dec. 3, 2015

Related U.S. Application Data

(63) Continuation-in-part of application No. 14/014,680, filed on Aug. 30, 2013, now Pat. No. 9,110,814.

(51) Int. Cl.
G06F 12/08    (2016.01)
G06F 9/302    (2006.01)
(Continued)

(52) U.S. Cl.
CPC ........ *G06F 9/30058* (2013.01); *G06F 8/4435* (2013.01); *G06F 9/30007* (2013.01);
(Continued)

(58) Field of Classification Search
CPC .... G06F 12/0875; G06F 8/52; G06F 9/30007; G06F 9/30069; G06F 9/30079
See application file for complete search history.

(56) References Cited

U.S. PATENT DOCUMENTS 5,774,386 A    6/1998 Pawle
6,553,394 B1    4/2003 Perry et al.
(Continued)

OTHER PUBLICATIONS

Kamimura, Kazutaka et al. "A Speed-Up Technique for an Auto-Memoization Processor by Reusing Partial Results of Instructions Regions" 2012 Third International Conference on Networking and Computing; 978-0-7695-4893-7/12, IEEE, Dec. 5-7, 2012.
(Continued)

*Primary Examiner* — Hal Schnee
(74) *Attorney, Agent, or Firm* — Jason H. Vick; Sheridan Ross, PC

(57) ABSTRACT

An exemplary embodiment relates generally to methods and apparatus of operating a computing device to perform approximate memoizations. Computer code analysis methods, special hardware units, and run-time apparatus that allow limited errors to occur are disclosed. A computer code generation process, part of compiler or interpreter of a computing system, targeting to insert special instructions in the software code of a computer program is also disclosed, wherein the special instructions may embed information to manage the approximation of value memoizations. The presented technology may reduce the electric power consumption of a computing system by reusing the results or part of the results of previous arithmetic or memory operations. Run-time hardware apparatus to manage the elimination of the operations and control the error introduced by approximate value memoizations are also disclosed.

33 Claims, 9 Drawing Sheets

(51) Int. Cl.
*G06F 9/45* (2006.01)
*G06F 9/30* (2006.01)
*G06F 12/0875* (2016.01)
*G06F 12/0862* (2016.01)
*G06F 9/38* (2006.01)

(52) U.S. Cl.
CPC ............ *G06F 9/38* (2013.01); *G06F 12/0862* (2013.01); *G06F 12/0875* (2013.01); *G06F 2212/452* (2013.01)

(56) References Cited

U.S. PATENT DOCUMENTS

| | | |
|---|---|---|
| 6,810,474 B1 | 10/2004 | Miki |
| 7,730,263 B2 | 6/2010 | Burtscher et al. |
| 9,110,814 B2 | 8/2015 | Keramidas et al. |
| 2002/0152368 A1 | 10/2002 | Nakamura |
| 2011/0302371 A1 | 12/2011 | Lysko |
| 2012/0096448 A1 | 4/2012 | Doyle |
| 2013/0073837 A1 | 3/2013 | Li et al. |
| 2013/0074057 A1 | 3/2013 | Gounares et al. |

OTHER PUBLICATIONS

Notice of Allowance for U.S. Appl. No. 14/014,680, mailed Jun. 17, 2015.

DEVICE AND METHOD FOR APPROXIMATE MEMOIZATION

CROSS-REFERENCE TO RELATED APPLICATIONS

This application is a Continuation-in-Part of U.S. patent application Ser. No. 14/014,680, filed Aug. 30, 2013, now U.S. Pat. No. 9,110,814, entitled "Device and Method for Eliminating Complex Operations in Processing Systems Based on Caching," the entirety of which is incorporated herein by reference.

FIELD

An exemplary embodiment relates generally to approximate value reuses, i.e., to value reuses that allow small and controllable errors to occur. An exemplary embodiment of the technology disclosed herein may eliminate redundant evaluation of complex operations, e.g., complex arithmetic expressions, or memory fetches, or both.

As it is known in the art, other terms that are commonly used for "value reuse" include value memorization (or simply memorization), value memoization (or simply memoization), and function caching (this particular term is used when the value reuse technique is performed for storing results of function applications). The term value memoization will be used herein for convenience, but it should be understood that this term is intended to encompass all alternative and equivalent terms and techniques.

As it is known by those skilled in the art, value memoization techniques may eliminate the redundant evaluation of arithmetic expressions or the redundant memory operations. A dedicated storage area in a nearby or high speed memory is required to save the output results of a code segment. The particular code segment may include a particular instruction, a group of instructions, a complete software function or subroutine, or even a plurality of functions or subroutines.

When evaluating a particular code segment, this dedicated storage area is first checked to identified if the output results are saved in the area. If this is the case, i.e., a hit occurs in the dedicated storage area, the output results are immediately retrieved from the dedicated storage area and used by the software program. If the output results for the given set of input parameters do not exist in the storage area, the output results are calculated, as it would normally happen in a system without the technology provided in this application. Finally, the output results are stored in the dedicated storage area for future uses.

In an exemplary embodiment of the present application, the inventors will use the term "value cache" to refer to and acknowledge this dedicated storage area. The inventors recognize that other related terms may exist or be invented in the future, but it should be understood that the term "value cache" is intended to encompass all alternative implementations and equivalent terms that refer to a storage area which functions as already described in the current application and as it will be further described below. The inventors would also like to clarify that without loss of generality, in all the embodiments disclosed herein, it is assumed that the value cache is implemented as a separate software controlled on-chip memory, either an SRAM or an embedded DRAM, but different arrangements are also possible. For example, the value cache can be implemented as part of a general purpose scratchpad memory, or as part of the general purpose register file(s), or, in general, using a part or the whole local on-chip storage usually present in computing systems.

Conceptually, the value cache functions as a lookup table which internally maps between a set of output results, e.g., the data itself, and a set of input parameters e.g., an address or an identifier(s) of the stored output data. Once the data is stored in the value cache, it may be accessed and retrieved more quickly than by fetching or calculating the original results from the original source input parameters. The value memoization technique therefore, if it is successfully employed, at least saves time and electrical power consumption by storing a limited volume of frequently accessed data in the value cache storage area.

In general, the memoization technique applies the theory of caching to programming, logical, and numerical level. For example, instead of recalculating the results of a function or a code segment, a previously calculated result can be used when the input parameters are the same or almost the same. As it can be recognized by those skilled in the art, the value reuse technique finds particular application in computer applications which calculate memory-intensive or processor intensive operations, like the graphics processing applications intended to render three-dimensional (3-D) graphics data.

The various methods and circuits disclosed herein provide a novel approach to the usage of value memoization. Although the embodiments described herein are generally illustrated in the more specific context of rendering of 3-D graphics data, those skilled in the art will appreciate the broader applicability of these techniques to general-purpose applications and systems. Furthermore, although several of the embodiments described herein are discussed with respect to a particular processing stage or type of graphics data, such as the pixel level shading operations (also known as pixel or fragment shaders), those skilled in the art will appreciate that many of the disclosed embodiments may be applied in other stages and/or to other graphics data such as vertex graphics operations.

BACKGROUND AND PRIOR ART

Value memoization is an optimization process that may eliminate redundant calculations and/or memory operations in a computer program by caching the output results of previous executions of complex instructions, a group of instructions, software functions or subroutines, or even groups of software functions or subroutines. In cases where the memoization is successful, i.e., the sought results do exist in value cache, value memoization may drastically reduce computation time and electrical power consumption of a computing system by only performing a specific operation at a time i.e., the value lookup operation.

However, as it can be recognized by those skilled in the art, value memoization may add time and electrical power consumption overheads to a computer program and system. The overheads may include testing the value cache prior to executing a particular code segment plus the overheads of storing and retrieving the results. In other words, the potential benefits of memoization not only depend on the number of instances it has eliminated, but, inter alia, on the time and electrical power spent in detecting the instances to be eliminated.

An exemplary embodiment of the technology disclosed in this application targets to increase the paybacks, measured either in terms of electrical power savings, or as performance improvements, or both, from utilizing memoization techniques especially when approximate memoizations are performed, i.e., small and controllable errors are intentionally allowed to occur during the memoization process. The applicants believe that there remains scope for improvements to approximate memoization and similar operations in computing systems. Thereby, it is desirable to provide new methods and apparatus for facilitating further electrical power savings and performance improvements when approximate memoization techniques are employed.

There have been proposed several disclosed methods that utilizing the value memoization technique for performance improvements. For example US2013/0073837, US2013/0074057, US2011/0302371, and US2012/0096448, where the applicants apply the value reuse technique at the boundaries of the application source code functions and they try to optimize the performance payback by selecting the most appropriate functions to perform memorization and by memorizing and reusing the results of the most frequently requested input parameters.

Kamimura et al. ("A Speed-up Technique for an Auto-Memoization Processor by Reusing Partial Results of Instruction Regions," 978-0-7695-4893-7/12, IEEE, 5-7 Dec. 2012) proposes a memorization technique wherein the detection and analysis of code segments for memoization is performed in the processor hardware.

U.S. Pat. No. 5,774,386 wherein the inventors break a color transformation function into subfunctions and the intermediate results of each subfunction are used for memorization. U.S. Pat. No. 6,553,394 wherein the invertors perform memoization using interpolation to generate results for input parameters that are near values of cached arguments. US2002/0152368 wherein the invertors propose a processor with instructions that include a value prediction field which is retained in a cache. U.S. Pat. No. 6,810,474 wherein the inventors propose a processor that caches instructions that have a long execution time along with their output values.

The inventors believe that the value memoization techniques in prior art differs from what is disclosed in this application in at least five reasons.

First, the applicants propose to extend the instruction set architecture (also known as an ISA) of the computing system intended to employ the technology disclosed in the present application with new instructions (also known as specifications) dedicated for the operation and the management of the value cache. The dedicated machine instructions may also embed an indication to manage approximations during the value memoization process.

Second, the applicants propose to extend the processing path (also known as data path) of the computing system intended to employ the technology disclosed in the present application with a new, special purpose functional unit dedicated to perform memoization. This special purpose functional unit may also employ additional functionality to reduce the precision of the input parameters during the process of matching the input parameters to the arguments stored in the special purpose functional unit, i.e., the value cache.

Third, the applicants disclose methods and techniques utilizing an electrical power minimization approach to identify appropriate points in the source or executable code of a software program and insert on those points the memoization management instructions.

Fourth, a hardware mechanism is disclosed which may monitor the dynamic behavior of an executing computer program and specific means are provided to deactivate and reactivate the memoization operations during the execution of the specific computer program.

Fifth, an additional mechanism is disclosed which may monitor the quality of the results generated by the approximate memoizations and specific means are provided to modify the precision of the input parameters during the process of matching the input parameters to the arguments stored in the value cache during the execution of one or more code segments of a particular computing program.

Sixth, the value cache storage area is augmented with extra functionalities, e.g., to dynamically change the order of the executing instructions of the executing computer program.

SUMMARY

The various aspects of the present disclosure provide methods and apparatus for operating a computing device to perform approximate value memoizations. The technology of this disclosure may be particularly beneficial in computer applications which calculate memory-intensive and processor-intensive operations, like the graphics processing applications intended to render 3-D graphics data.

The inventors propose new dedicate machine level instructions to be included in the instruction set architecture of a computing system intended to utilize the technology provided in this application. The instructions will be responsible for the management of the value cache. The primary operations performed by value cache are AddEntries and LookupEntries. AddEntries places results in the value cache and LookupEntries retrieves entries from the value cache (in case of a value cache hit), or produces misses if there is no corresponding entry or entries for the sought input parameters.

The dedicated memoization instructions may be inserted into a particular code segment by a compiler, a just-in-time compiler, an interpreter, or even an assembler of an instruction set computing system.

The LookupEntries instruction may contain extra fields either as part of the instruction opcode or as an extra instruction field argument. This extra information may include specific indications that may increase the benefits of value memoization. For example, additional information may be added to indicate if the input parameters are interchangeable or independent from sign.

The LookupEntries instruction may also embed information to control (increase, decrease, or set) the precision of the input parameters during the process of matching the input parameters to the arguments stored in the value cache.

An exemplary embodiment of the invention provides a method for inserting the value cache management instructions in the source code of the software applications. The method solves this insertion problem as a power minimization problem.

Furthermore, a hardware mechanism is disclosed which may further improve the potential performance improvements and/or the electrical power savings achieved by memoization. The mechanism detects at run-time the payback provided by memoization and accordingly acts either to alter the memorization method or deactivate it temporary or permanently.

The value cache storage area may be further extended to include extra information and additional functionalities that may dynamically change the order of the dynamic instruction execution of a software program and thereby to alter or even to increase the paybacks provided by memoization.

An additional hardware mechanism is disclosed which may monitor the quality of the results generated by the approximate memoizations. The mechanism may operate at run-time and alter the precision of the input parameters during the process of matching the input parameters to the arguments stored in value cache.

This Summary is provided to introduce a selection of concepts in a simplified form that are further described below in the Detailed Description and also illustrated in the accompanying drawings. This Summary is not intended to identify key features or essential features of the claimed subject matter, nor is it intended to be used to limit the scope of the claimed subject matter.

BRIEF DESCRIPTION OF THE DRAWINGS

The aspects and advantages of the present invention are better understood from the detailed description of preferred embodiments of the invention with reference to the drawings, in which.

DETAILED DESCRIPTION

The various methods and apparatus disclosed herein relate to techniques for eliminating the redundant arithmetic calculations or memory operations during data processing. Although the embodiments described herein are generally illustrated in the more specific context of processing of 3-D graphics data, those skilled in the art will appreciate the broader applicability of the disclosed techniques, e.g., the applicability to the processing of data by a general purpose instruction set computer or to the processing of multimedia data by an instruction set multimedia processor.

Furthermore, although the disclosed technology are presented with respect to a particular processing stage of pixel data, known as fragment shading stage, those skilled in the art will appreciate that the disclosed technology may be applied in other stages and/or to other graphics data, such as the vertex-level operations.

Figure 1:
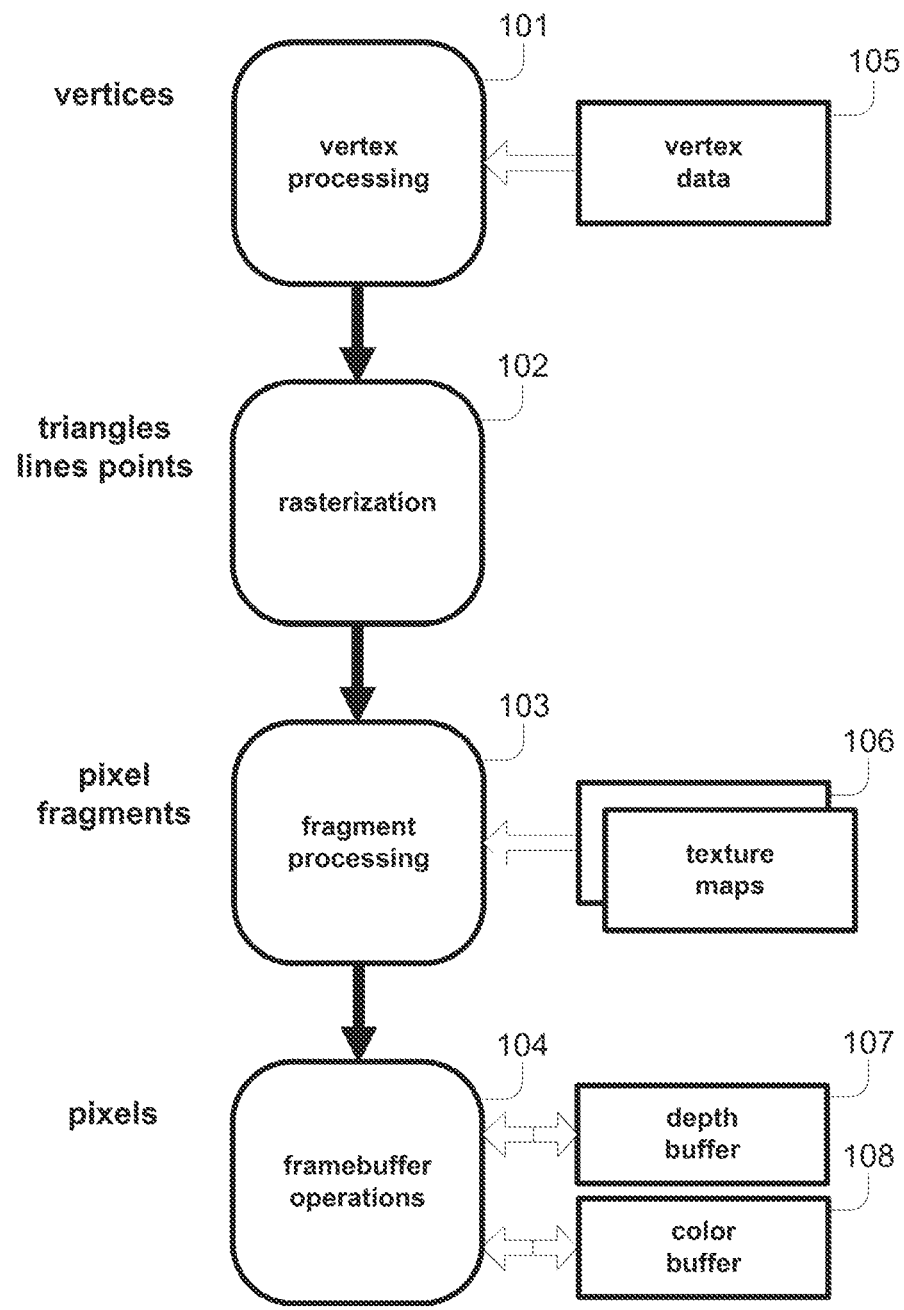
FIG. 1 is a flow diagram of a typical 3-D graphics processing pipeline.

FIG. 1 illustrates a flow diagram of a conventional graphics processing unit (GPU) indented to render 3-D images. Those skilled in the art will recognize the general functions of the graphics processing stages as each of these stages correspond to counterparts in conventional graphics processing stages. As shown in FIG. 1, an image is synthesized from a model consisting of geometric shape and appearance descriptions, including, inter alia, color and surface textures, for each object in the scene and environment descriptions such as lighting or atmospheric properties. The result of the synthesis is an image represented as a two-dimensional (2-D) rectangular array of pixel elements, where each pixel represents a discrete color sample of the image. To synthesize the final image, each object in the scene is rendered using a four-step sequence which includes: geometry processing 101, rasterization 102, pixel or fragment processing 103, and frame buffer processing 104. A detailed description of those well-known graphics rendering operations is not considered necessary to a complete understanding of the present invention. However, a brief description is given below.

Geometry processing transforms a 3-D polygonal, usually a triangle, representation of an object surface to ultimately produce a 2-D projection of the object triangles. The transformations operate on the vertices 105 of the incoming triangle representation and apply mathematical operations which are typically termed as vertex shading processing. Rasterization converts each resulting 2-D triangle to a collection of pixel fragments and each pixel fragment is subsequently processed to compute a final color value, a process known as pixel or fragment shading processing. The computation of this color value can range from simply calculating an interpolated color value to computing complex arithmetic equations incorporating geometric and appearance descriptions of an object and the description of the environment. The computations may include texture mapping operations that use the parametric coordinates of a fragment to sample an associated image or images (called texture maps 106) to generate a color value or other shading parameters. The resulting shaded pixel fragments are eventually written to a color buffer 108 that holds a single fragment for each pixel in the final image. As part of this operation, some other graphics related operations may occur, e.g., determining the pixel visibility using a special storage area usually called depth buffer 107.

As is known in the art, the two stages of the 3-D graphics pipeline which are typically programmable are the stages that occur the vertex and the fragment operations. However, different arrangements are also possible e.g., the rasterization stage may be also programmable or even the depth color related operations may be controlled by a programmable engine. The two stages may be programmed by a general purpose software language, such as C or Fortran, or by an application specific graphics language such as HLSL, Cg, or GLSL.

Those skilled in the art will recognize that the vertex and the fragment stages are typically programmed with small custom shading programs, similar to subroutines, that are invoked for each vertex and for each pixel fragment. Those small, although computational and memory intensive programs, are usually referred to as shaders while other terms are also possible.

The technology provided herein does not pertain to a specific arrangement of the programmable stages of the graphics processing pipeline and it is more generally applicable even to non-graphics operations. In addition, the disclosed methods and apparatus are not restricted to a particular shading or general purpose programming language.

Fragment shaders typically consist of complex arithmetic calculations that may incorporate geometric and appearance descriptions of the rendered objects and environment descriptions. Such arithmetic operations may include machine level instructions that perform vectorized operations, multiple-add operations, square-root calculations, reciprocals etc. Furthermore, fragment shaders typically also include computations and the associated memory fetches for texture mapping operations.

As it can be recognized by those skilled in the art, a subset of the fragment shading operations can be performed under small error budgets, e.g., by lowering the precision of specific calculations. Since the final color values generated by fragment shaders will be interpreted by human senses which are not perfect, in accordance to the present application, it is possible to introduce small and controllable errors during the fragment shading operations, if such approach will result in performance improvements or in electrical power reductions or both, even if such approach will not guarantee perfectly artifact-free output images.

Figure 2:
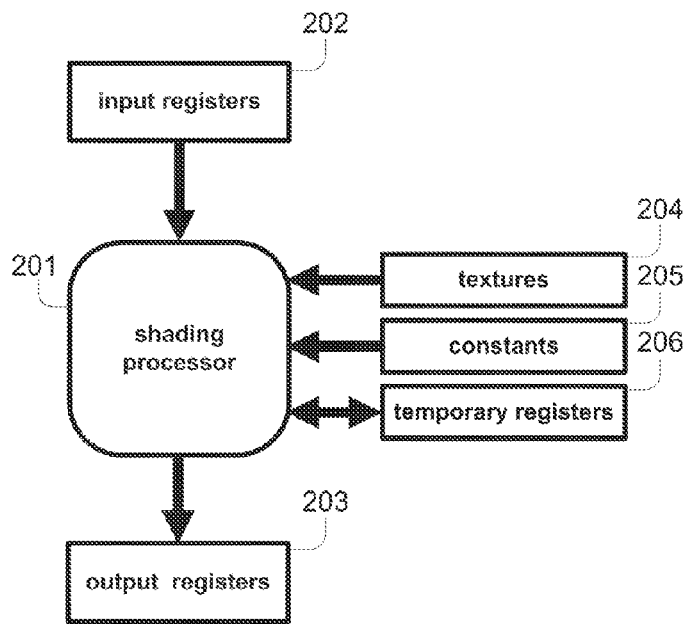
FIG. 2 illustrates an exemplary diagram of a shading processor according to one or more embodiments of the present application.

FIG. 2 illustrates an exemplary block diagram of an arrangement of a shading processor 201 designed to execute a fragment shader software program. During execution, the shading processor operates on a fixed set of inputs and produces a fixed set of outputs intended to be used by the next stage of the graphics processing pipeline. The fragment shading program has access to a small set of constant parameters typically located in on-chip scratch registers 205, to another small set of registers intended to keep the intermediate results 206 and to a larger set of, typically off-chip, texture maps 204.

In the arrangement depicted in FIG. 2, the set of input parameters, the set of output parameters, and the set of constant parameters are physically organized in separate register files. However, different arrangements are also possible. For example, the two or all the sets of these parameters can be located in a single on-chip scratch storage area which may be multi-banked or not.

In the particular arrangement illustrated in FIG. 2, the input parameters located in the input register file 202 include, inter alia, the position of a target pixel, a set of color values, and a set of coordinates, usually the fog and the texture coordinates. The output parameters stored in the output register file 203 typically include the final color value of the pixel and extra information related to the visibility of the pixel, usually known as depth value.

In the technology described in this disclosure, rather than executing one-by-one each instruction of an input shader program, as it would normally happen without applying the techniques disclosed herein, one or more instructions, preferably the most expensive instructions in terms of execution time or electrical power consumption, are bypassed i.e., the one or more instructions are not executed. The part of the software code containing those one or more bypassed instructions will be termed as potentially skipped code segment (PSCS) hereafter. The method for bypassing the PSCS relies on memoization techniques according to which it is possible to eliminate redundant complex arithmetic calculations or redundant memory operations by memorizing or caching the results of previous computations of a PSCS. As already mentioned, the dedicated storage area used for keeping the results of the previous computations will be referred to as value cache.

Thereby, when evaluating a particular PSCS for or at a given set of new input parameters, the value cache is first checked to identify if the output results are saved in this area. If this is the case, i.e., a hit occurs in value cache, the output results are immediately retrieved from the value cache and used by the software program. If the output results for the given set of input parameters are not in the value cache, the output results are calculated, as it would normally happen in a system without the technology provided herein, and, finally, the output results are stored in the value cache for future uses.

As it will be further discussed below, the inventors have recognized that the above-mentioned process can be used to reduce significantly the number of the redundant arithmetic calculations or memory operations in fragment shader programs, thereby significantly reducing the number of executing instructions and hence this process can result in an improvement in the performance or a reduction in electrical power consumption or both.

The inventors also have recognized that it may be a relatively common occurrence for a new pixel to have the same or similar final color to a just rendered pixel, the final color of which has been already calculated, e.g., in regions of an image that do not change or do not significantly change from pixel to pixel such as the sky in a digital image. Furthermore, the inventors have recognized that even if the final color of two consecutive rendered pixels is not the same, there is a great possibility that many of the shading operations performed for the two pixels will be the same, e.g., the calculations that depend on the position of the camera. Thus, by facilitating the ability to identify memoization opportunities and avoid executing expensive redundant arithmetic calculations or redundant memory accesses, a significant improvement in electrical power consumption or in performance or both can be achieved.

Thus, the technology described in this application can be used to significantly reduce the electrical power consumption and/or increase the performance, by facilitating the identification and elimination of redundant calculations and memory operations in the fragment shading programs.

An exemplary embodiment of the present application extends to the provision of a hardware component which is able to monitor the redundancy elimination process (in other words, the value cache operation) at run-time and disable the memoization mechanism if it is deemed as non-beneficial in terms of electrical power savings or performance improvements. Furthermore, the technology described in this application offers new means to increase the number of eliminated instructions by, for example, identifying if the input parameters of the PSCS are interchangeable or by performing approximate memoizations, i.e., by allowing small and controllable errors to occur during the value cache lookup process.

An exemplary embodiment of the present application extends also to the provision of another hardware component which may monitor at run-time the quality of the results generated by approximate memoizations. The hardware components may contain functionality to alter the precision of the input parameters during the process of matching the input parameters to the arguments stored in value cache of one or more code segments of a particular software program.

Figure 3:
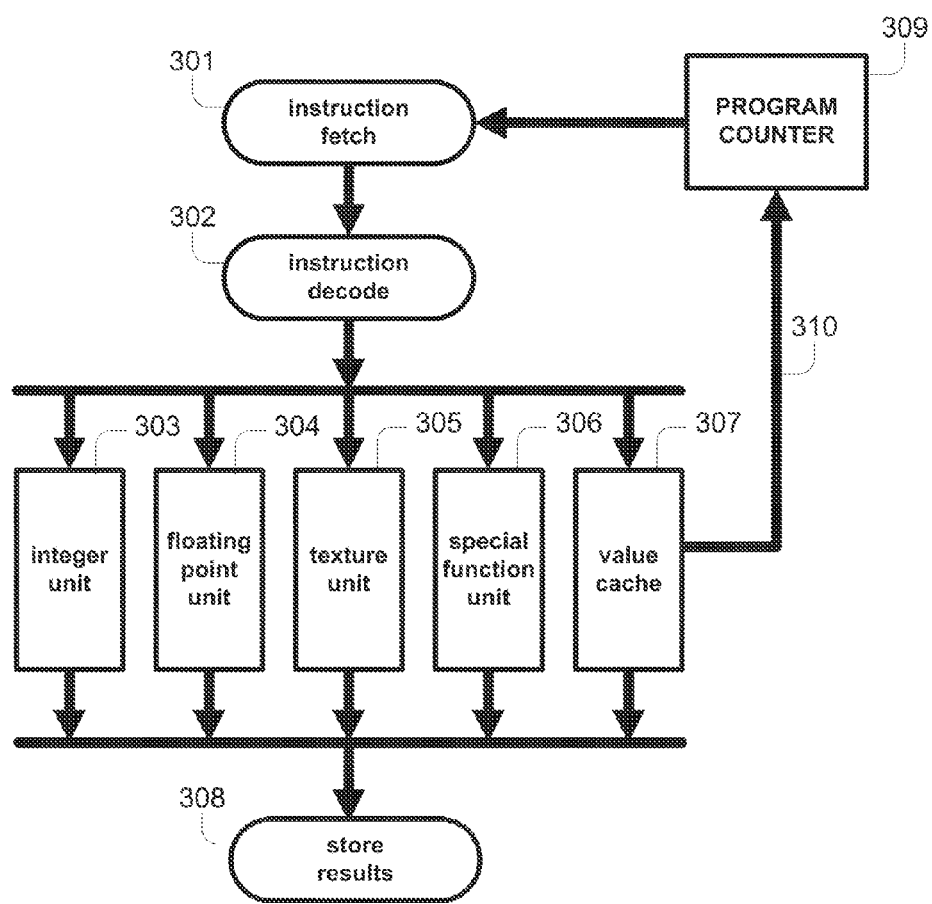
FIG. 3 illustrates a block diagram of an exemplary embodiment of the shading processor pipeline.

FIG. 3 illustrates an arrangement of a fragment shading processor which is in accordance to one or more embodiments of this invention. The arrangement of the fragment processor may include a fairly simple in-order processor, while different arrangements are also possible. After instructions are fetched 301, they are decoded and their operands are fetched 302. Depending on the type of operands, one of the three different register files are probed, based on the type of value that needs to be read, i.e., the constant, the input, or temporary register file as depicted in FIG. 2.

Upon the source operands for a given instruction are fetched, the instruction is dispatched to the corresponding functional unit (FU). Operand buffering may be required in this step, if the execution of an instruction to a FU takes several cycles. Typically, four types of FUs are included in a fragment processor, although other arrangements are also possible. Those FUs are the ALU 303, to perform scalar or vector arithmetic and logic operations on either integer or floating point data, the special function unit 304, to perform complex arithmetic calculations, like reciprocals or square root and sine calculations, the memory unit 305, to perform load/store operations to the color buffer, and the texture unit 306, to compute the color of a texture.

In the last pipeline stage 308, the results of the FUs are stored in the temporal or in the output register file. The embodiment of FIG. 3 also contains a special purpose register, called program counter 309, referred as PC hereafter, which contains the address of the next to be fetched instruction. The applicants believe that a detailed explanation of the operation of the arrangement of the fragment processor, shown in FIG. 3, is not necessary for a complete understanding of the present application.

The invertors want to clarify that the illustration depicted in FIG. 3 corresponds to a specific arrangement of a fragment processor. However, other arrangements are also possible. For example, a different number of pipeline stages may be employed or a form of simultaneous multi-threading processing may be also employed. The invertors desire to clarify that the technology disclosed in the present application does not rely on a specific arrangement of a fragment processor and it can be applied to all alternative configurations and arrangements of a fragment processor.

According to the first aspect of the technology described herein, there is provided a method for explicitly architecting and operating a fragment processor to detect and eliminate the redundant or almost redundant arithmetic or memory operations. In contrast to prior art schemes discussed above, the technology provided herein proposes the provision of an extra FU to be inserted in the data path of a fragment processor. The role of this new FU will be to explicitly perform memoization operations or value reuses in order to eliminate the redundant or almost redundant evaluation of complex arithmetic expressions and memory operations.

The proposed new FU includes a dedicated storage area intended to cache or hold the results of previous computations, i.e., the value cache and the associated logic. This FU is named by the applicants after the term value cache functional unit (VCFU) 307 and the technology presented in this application discloses techniques for the operation of this unit.

The inventors desire to clarify that the term value cache functional unit is intended to encompass all the alternative or equivalent devices or circuits that operate as defined by the methods and techniques disclosed in the present invention.

An exemplary embodiment of VCFU is illustrated in FIG. 3.

VCFU operates as a typical functional unit since it is managed by specific machine-level instructions, part of regular processor ISA, and it has access to the various register files of the processor. Likewise, it is fed by input data located either in the input, constant, or temporary register file, it performs the corresponding operations and register reads as uniquely identified by the corresponding machine-level instructions, and it stores the results to the appropriate registers in the output or temporary register file, again as dictated by the corresponding machine-level instructions.

However, as it can be recognized by those skilled in art and as also shown in FIG. 3, VCFU is equipped with a unique functionality typically absent in conventional FUs of a typical fragment processor. The unique characteristic is identified by the extra path 310.

Conceptually, the value cache functions as a lookup table which internally maps between a set of output results, e.g., the data itself, and a set of input parameters e.g., an address or an identifier(s) of the stored output data. Once the data is stored in the value cache, it may be accessed and retrieved while the step-by-step calculation from the initial source input parameters is bypassed, i.e., a particular code segment. Thereby, if a successful value cache match occurs (referred as hit hereafter), the ordering of the to-be-executed instructions of the fragment shader program must be also modified.

VCFU is responsible thereof to inform the PC that a dynamic branching in the fragment shader code must be immediately performed. In other words, the PC of the fragment processor is required to be notified about the size of the PSCS, namely the number of instructions consisting the PSCS, and accordingly perform the above dynamic branching. The detailed description of this dynamic branching process will be provided in the rest of this disclosure through two exemplary value cache embodiments.

Those skilled in the art will appreciate that this dynamic branching process can be viewed as a regular dynamic branch initiated by conventional control-flow instructions, e.g., conventional if-then like notations, which typically exist in almost all programming languages.

According to the second aspect of the technology discussed herein, the present invention extends to the provision of dedicated machine-level instructions for the explicit management of VCFU. In particular, the applicants propose to extend the instruction set architecture (ISA) of a processor intended to employ the technology disclosed herein with extra instructions dedicated for the operation of the invented VCFU.

As it can be recognized by those skilled in the art, the primary operations performed by VCFU are the AddEntries and the LookupEntries operation. AddEntries places new results in the value cache and LookupEntries retrieves one or more entries from the value cache, in case of a value cache hit, or produces misses if there is no corresponding entry or entries for the sought input parameters.

Figure 4:
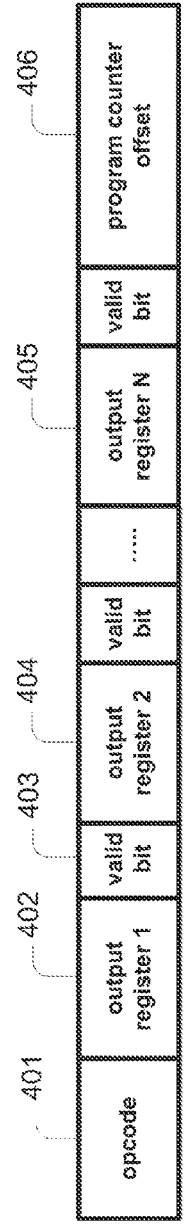
FIG. 4 illustrates an exemplary embodiment of the AddEntries instruction.

An exemplary structure of the AddEntries instruction is illustrated in FIG. 4.

The AddEntries instruction is responsible to place a new set of output results into the value cache storage area for future uses. The output results are defined as regular operands 402, 404, 405 inserted in the instruction structure and each operand corresponds to an identifier indicating a specific register in one of the register files of a processor. The identifier may be a single number acting as a pointer to a specific register belonging to a register file, while other potential arrangements are also possible.

Moreover, each register operand in the AddEntries instruction is associated by a valid bit 403. The valid bit is responsible to indicate if the corresponding register operand should be decoded by the fragment shader decoder or if the corresponding register operand should be ignored by the processing pipeline, i.e., by the processor decoder or by the VCFU.

In addition, the instruction structure of FIG. 4 includes an immediate value field 406. This field is equal to the number of machine instructions including an under evaluation PSCS of a target software program. The immediate value will be stored in the value cache memory array. As it will be understood upon the complete reading of this invention, in case of a value cache hit, the number embodied in this instruction field will be forwarded to processor PC, via path 310, to perform the dynamic branching into the fragment shader code.

The embodiment of the AddEntries instruction also contains a dedicated field 401 to hold the machine code, also known as opcode, of the instruction. As is known in art, this field acts as a unique identifier of the instruction.

As it can be recognized by those skilled in the art, the described embodiment of the AddEntries instruction is configured to support a variable number of output results or a variable number of output registers; however this arrangement is not necessary. For example, separate instructions, with different identifiers or opcodes, may be employed to support one output operand, two output registers, or three output registers and so on. Obviously, in the latter arrangement no valid bits will be required to be inserted in the instruction structure. Differently stated, the embodiment presented in FIG. 4 is a generalized structure of the AddEntries instruction and it is intended to encompass all alternative or equivalent arrangements, like the ones mentioned above.

Upon the AddEntries instruction is fetched, it passes through the decode stage of a fragment processor. At this point, all the valid register operands are extracted from the instruction operand bits. Consequently, the register operands are sent to the corresponding register files. When the register files receive the register operands, one or more register read transactions are initiated. Upon the results from the register files are made available, they are forwarded, along with some control bits, to VCFU for further processing.

The associated logic of VCFU is responsible at this point to store the received values in an appropriate format for future uses. The received values are saved in value cache storage area, the organization of which will be discussed later in this invention.

Figure 5:
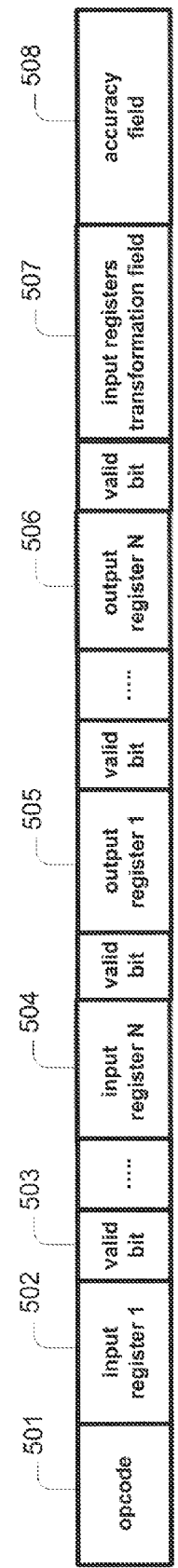
FIG. 5 illustrates an exemplary embodiment of the LookupEntries instruction.

Similar to AddEntries instruction, an exemplary structure of the LookupEntries instruction is illustrated in FIG. 5.

The LookupEntries instruction is responsible to retrieve the output results of an under evaluation PSCS for or at a given set of new input parameters. Namely, during the execution of a LookupEntries instruction, the value cache is first checked to find out if the output results reside in the value cache area. The input parameters in this case act as a key to search the value cache storage area.

The input parameters and the output results are defined as regular operands 502, 504, 505, 506 inserted in the instruction structure and each operand corresponds to an identifier indicating a specific register in one of the register files of a fragment processor, i.e., one of the four register files shown in FIG. 2. The identifier may be a single number acting as a pointer to a particular register of a specific register file, while other arrangements are also possible.

Similar to AddEntries instruction, each register operand in the LookupEntries instruction is associated by a valid bit 503. The valid bit is responsible to indicate if the corresponding register operand should be decoded by the processor decoder or if the corresponding register operand should be ignored by the processing pipeline i.e., by the processor decoder or by the VCFU.

The embodiment of LookupEntries instruction is configured to support a variable number of input parameters, namely input register operands in FIG. 5, and a variable number of output results, namely output register operands in FIG. 5; however this arrangement is not necessary. For example, separate instructions, with different instruction identifiers or opcodes, may be employed to support a plethora of input-output operands pair, e.g., one input operand and one output operand, one input operand and two output operands, two input operands and three output operands, and so on. Of course, in the latter arrangement no valid bits will be required to be inserted in the instruction structure. Differently stated, the embodiment presented in FIG. 5 is a generalized structure of a LookupEntries instruction and it is intended to encompass all alternative or equivalent arrangements, like the ones mentioned above.

Upon the LookupEntries instruction being fetched, it passes through the decode stage of the processor. At this point, all valid input register operands are extracted from the instruction operand bits. Consequently, the extracted input register operands are sent to the one or more register files (either the constant, the input, or the temporary register file). When the corresponding register files receive the input register operands, one or more register read transactions are initiated. Upon the results from the register files are made available, they are forwarded to VCFU for further processing.

The associated logic of VCFU is responsible at this step to compare the received values, new input parameters, against the arguments stored in VCFU from previous computations. If there is no corresponding value cache entry for the sought input parameters, i.e., there is a value cache miss, then no more actions will be performed for the LookEntries instruction, namely the instruction will exit the processor pipeline with no extra operations.

According to the technology disclosed in the present invention, the process of comparing the input parameters against the arguments stored in VCFU may be performed in an approximate fashion. That may happen by reducing the precision of the input parameters during the process of matching the input parameters to the arguments stored in value cache. As it will further discussed, an embodiment of the approximate process may simply exclude a predefined or a dynamically calculated number of bits during the comparison of the input parameters against the arguments stored in VCFU.

In case of a value cache hit, the value cache contains the output results which are associated with the given input parameters. The output results may be forwarded to the next pipeline stage 308 of the processor. At this stage, the output register operands are extracted from the instruction operand bits. Consequently, the extracted output register operands are sent to the one or more register files of the processor (either the output or the temporary register file in this case). When the register files receive the output register operands, one or more register write transactions are initiated, namely the retrieved output results are stored in the corresponding registers. Upon the register write transactions are finalized, the output results are ready to be consumed by the fragment shading program and finally the LookupEntries instruction exits the processor pipeline.

Moreover, in the case of a value cache hit, the ordering of the to-be-executed instructions of the fragment shader program must be also modified. The detailed description of this operation will be provided in the remaining of this disclosure through two examples.

The embodiment of the LookupEntries instruction, shown in FIG. 5, also contains a dedicated field 501 to hold the machine code of the instruction. As is known in art, this field acts as a unique identifier of the instruction.

According to a third aspect of the technology discussed herein, the present invention discloses techniques to optimize the usage of VCFU, that is to increase the number of the value cache hits further improving the performance and/or the electrical power savings, or both, of a computing system that may utilize the technology presented in this invention.

A preferred method to increase the occurrences of value cache hits may be to add an extra field in the instruction structure, like the field tagged as 507. The field can be set by considering redundancy related properties inherent in potentially skipped instructions. More specifically, many arithmetic calculations may include specific properties that may generate extra repetitive or redundant operations if the input parameters are appropriately transformed.

The purpose of transforming the input parameters, namely the input register operands, of a given PSCS is to bring them in a desired arrangement, so as to increase the occurrences of value cache hits. Consequently, the extra field 507 may contain an indicator of how a new set of input parameters may be transformed. This indicator may be encoded in any desired format, for example using one-hot encoding or any other suitable encoding scheme.

The inventors have recognized that, inter alia, there are two possible input parameters transformations that may significantly enhance the resulting benefits of the underlying value reuse mechanism. These transformations are the interchangeability of the input parameters and the sign independence transformations which are explained below.

According to an embodiment of a transformation, the input parameters of certain operations may be interchanged without affecting the output results. A simple case of the embodiment may be the multiply or addition instructions. However, the inventors have recognized the broader applicability of this embodiment in PSCS consisting of two or more instructions.

In general, the interchangeable property may be extended to include cases in which the input parameters are more than two. If, for example, there are four input parameters, the transformation field of LookupEntries instruction may be appropriately decoded to denote, for example, which pairs or triples of input parameters, out of four, are interchangeable. Again, the encoding can be done in any suitable format. This invention intends to include all the alternative or equivalent arrangements that explicitly denote in the LookupEntries instruction structure the possible interchangeable options of the input parameters in a given PSCS independently of the underling encoding scheme.

According to another embodiment of a transformation, the sign of the input parameters of certain arithmetic computations may not affect the absolute value, not the signed value, of the output results. A simple case of this embodiment can be the multiply or division instructions. However, the applicants have recognized the broader applicability of this transformation in PSCS including two or more instructions.

In general, the sign independence property of the input parameters can be extended to include cases in which the input parameters are more than two. If, for example, there are four input parameters, the transformation field of LookupEntries instruction can be appropriately decoded to denote, for example, which input parameters, out of four, do not affect the absolute value of the output results. Again, the encoding can be done in any suitable format. This application intends to include all the alternative or equivalent arrangements that explicitly denote in the LookupEntries instruction structure that the sign of one or more input parameters do not affect the absolute value of the output results in a given PSCS independently of the underling encoding scheme.

Another preferred technique to optimize the usage of VCFU may be to add another extra field in the LookupEntries structure, like the field tagged as 508. This field may be set by considering that a subset of the computing operations can be performed under small error budgets, e.g., by lowering the precision of specific arithmetic calculations. That is to allow approximate memoizations to be performed. This property may be particularly applicable when processing graphics data where the final generated color values are interpreted by the human senses which are not perfect. Differently stated, it is possible to introduce small and controllable errors during the fragment shading operations, if the process will result in performance improvements or in electrical power reductions or both, even if such process will not guarantee perfectly artifact-free output images.

The invertors have recognized that the number of value cache hits may be significantly increased if approximated memoizations are enforced, i.e., the matching operation, between the new input parameters and the contents already stored in VCFU from previous calculations, termed as matching operands hereafter, will be performed by excluding some parts of the matching operands. An embodiment of the discussed method may be to simply exclude some bits of the matching operands during the matching process. As it can be recognized by those skilled in the art, the preferred parts that may be excluded from the matching process are the parts comprising by the least significant bits, e.g., the rightmost bits in a fixed point format, of the matching operands.

For example, if a new set of input parameters and the arguments stored in VCFU differ only in some rightmost bits, then the possibility to experience a value cache hit is significantly increased further increasing the performance improvements and/or the electrical power savings, or both, achieved by the approximate memoization mechanism.

The field denoted as 508 may be an indicator of the number of bits of the matching operands that may be ignored during the matching process. In accordance to an embodiment of the present invention, the number of bits may be unique and it may refer to all input operands. In another embodiment, a different number of bits may be ignored in each input operand.

By way of a non-limiting example, if we assume that the input operands are two, the information stored in field 508 may be appropriately encoded to indicate that one bit from both input parameters may be ignored or one bit from the first input parameter and two bits for the second input parameter may be ignored and so on do forth.

The indicator stored in the LookupEntries instruction structure 508 may be encoded in any desired format, e.g., using one-hot encoding or any other suitable encoding scheme. The present invention intends to include all alternative or equivalent arrangements that explicitly denote in the LookupEntries instruction the number of the bits that can be excluded during the value cache matching operations independently of the underling encoding scheme.

As it can be recognized by those skilled in the art, by performing approximate memoizations, errors may be introduced in the final color values generated by the corresponding fragment shaders. The resulting errors may lead to undesirable visual artifacts in the rendered images under some circumstances. However, those skilled in the art will understand that a subset of the shading operations can be performed under small error budgets, since the final color values generated by the fragment shaders will be interpreted by the human senses which are not perfect. Differently stated, it is possible to introduce small and controllable errors during the approximate memoization process, if such approach will result in performance improvements or in electrical power reductions or both, even if such approach will not guarantee perfectly artifact-free output images.

In essence, the field 508 must be carefully set so as, inter alia, to minimize the visual artifacts of the generated color data. The exact number of bits in each input parameter that may be excluded from the matching comparison process is a subject under optimization and must be identified after analyzing various other parameters of the graphics system such as, but not limited to, the depth of the color data produced by the tile rendering process, the electrical power consumed by the processing path of the graphics processor, and/or the effectiveness of the rendering algorithms used by the graphics processor e.g., anti-aliasing algorithms.

Furthermore, since the disclosed embodiments may be used, for example, for reducing the electrical power consumption in mobile devices, such as PDAs, smart phones, or tablets, the exact number of bits in each input parameter that may be excluded from the matching process may be defined after considering the requirements defined either by the user, e.g., quality of service requirements set by a user, and/or by the run-time conditions of the computing system, e.g., the remaining battery life of a portable device or the lighting conditions of the environment in which the graphics device operates, and/or by a combination of the above parameters.

In another embodiment of the present invention, the number of bits ignored during approximate memoizations may be defined in design time and/or in compiler time via profiling. For example, during the design and/or implementation and/or compilation of a software program, an examination of all the possible number of bits for each input parameter may be performed and an appropriate arrangement may be decided based on specific optimization criteria which may be, inter alia, the quality of the rendered images, the reduction in electrical power consumption, the improvements in performance, the user requirements, or even a combination of all or some of the above parameters.

In another embodiment, the above analysis may be performed by a just in time environment in which a just in time compiler may take into account the above exemplary criteria and accordingly modify at run-time the intermediate or executable code of an input software program.

The inventors want to clarify that the two discussed techniques, notated by fields 507 and 508 in the LookupEntries instruction structure, are optional, that is, the LookupEntries instruction may or may not contain those two extra fields or may or may not contain one of those two extra fields. However, the inventors have recognized that the two said technique may optimize the usage of VCFU and as a result to increase the benefits offered by the memoization mechanism.

As can be understood by the experienced readers of this invention, the value cache mechanism may be extended by extra circuitry in order to support the above two optimization techniques. This extra circuitry will add extra delay and extra consumed electrical power to the underlying computing system. Therefore, the utilization of the above two techniques and the corresponding embodiments must be done after considering if the extra benefits provided by one or by both said techniques compensate the overheads introduced by the extra circuitry required to support the corresponding hardware implementations of those two methods.

In essence, the inventors recognize that the inclusion of one or both of the above methods may be done after analyzing various parameters of the graphics system, such as, inter alia, the increase in value cache hits, the electrical power consumed by the extra circuitry, and the electrical power consumed by the processing path of the processor.

In an embodiment of the present invention, the analysis may be performed in design time via profiling. For example, during the design and/or the implementation of the memoization mechanism, an examination of the benefits provided by each one or by both said techniques may be performed and an appropriate arrangement may be decided based on specific optimization criteria which may be, inter alia, the reduction in electrical power consumption, the improvements in performance, the user requirements, or even a combination of all or some of the above parameters.

In another embodiment, the above analysis may be performed by a just in time environment in which a just in time compiler may take into account the above exemplary criteria and accordingly modify at run-time the intermediate or executable code of a target software program. Note that in the last two preferred embodiments, the extra circuitry required by the two methods may be included in the underlying memoization mechanism, but this extra circuitry may be deactivated in order to eliminate the consumed electrical power and/or the extra delay introduced by the circuitry.

In another particular embodiment, the reduction in the precision of the input parameters during the matching operations may be tracked and controlled at run-time by a dedicated hardware circuitry during the regular execution of a target software program. The hardware circuitry will be further discussed in the remaining of the present disclosure.

The applicants also want to clarify that the arrangements of the two memoization instructions illustrated in FIG. 4 and FIG. 5 correspond to exemplary structures of these instructions and the present invention intends to encompass all alternative or equivalent embodiments of computer instructions that operate in an alternative or equivalent way to the functionality presented in the foregoing description.

Furthermore, the inventors also want to clarify that in accordance with the present disclosure, the two said memoization instructions will be part of the instruction set architecture (ISA) of an instruction set processor or a computing system intended to employ the technology disclosed herein. That is, these two machine-level instructions are meant to be visible to the compiler and assembler or the interpreter of a target processor or a target computing system.

In an exemplary embodiment, those memoization decorations will be automatically inserted in the software code of a target software program by a compiler or an interpreter. In another exemplary embodiment, the memoization decorations may be automatically inserted in the software code of a target software program by a just in time compiler that may be invoked by a just in time environment in which the software program is executed. In a yet another preferred embodiment, the programmer or the writer of a software program may insert specific indicators to the code of the software program as to facilitate or force the compiler, or the interpreter or the just in time compiler to insert the memoization decorations. A combination of some of the above embodiments is also desirable.

A methodology for inserting the memoization instructions in the code of a software program will be discussed hereafter. The disclosed methodology will be presented in the form of exemplary cases showing particularly preferred embodiments of the use of the memoization process and the VCFU. The inventors want to clarify that the exemplary cases are provided for purposes of illustration and description and they are not intended to be exhaustive or limit the subject matter to the precise description of those exemplary cases.

Furthermore, the presented exemplary embodiments were chosen and they will be described in order to best explain the principles of the invented memoization mechanism and its practical application to reduce the electrical power consumed by complex arithmetic calculations which typically exist in graphics data processing or, in general, to computationally intensive programs. However, those skilled in the art will recognize the broader applicability of the disclosed technology either to improve the performance of a target device leading to more rapid systems and/or to reduce the memory transactions related to specific graphics operations.

According to the exemplary embodiments the memoization instructions are meant to be inserted by a compiler in the target object file of a target software program during the compiler code generation process. However, the technology of this application is more generally applicable. For example, a just in time environment may be also used to monitor and analyze the target executing program and accordingly modify its executable code. Furthermore, the insertion of the memoization instructions may be performed by analyzing also the intermediate code, the binary executable code, a decompiled code, or other forms of executable code.

For illustration and description purposes the presented exemplary embodiments will be provided using a human readable source code which can be considered that is ready to be translated or compiled to intermediate code or machine executable code.

EXAMPLE 1

Figure 6:
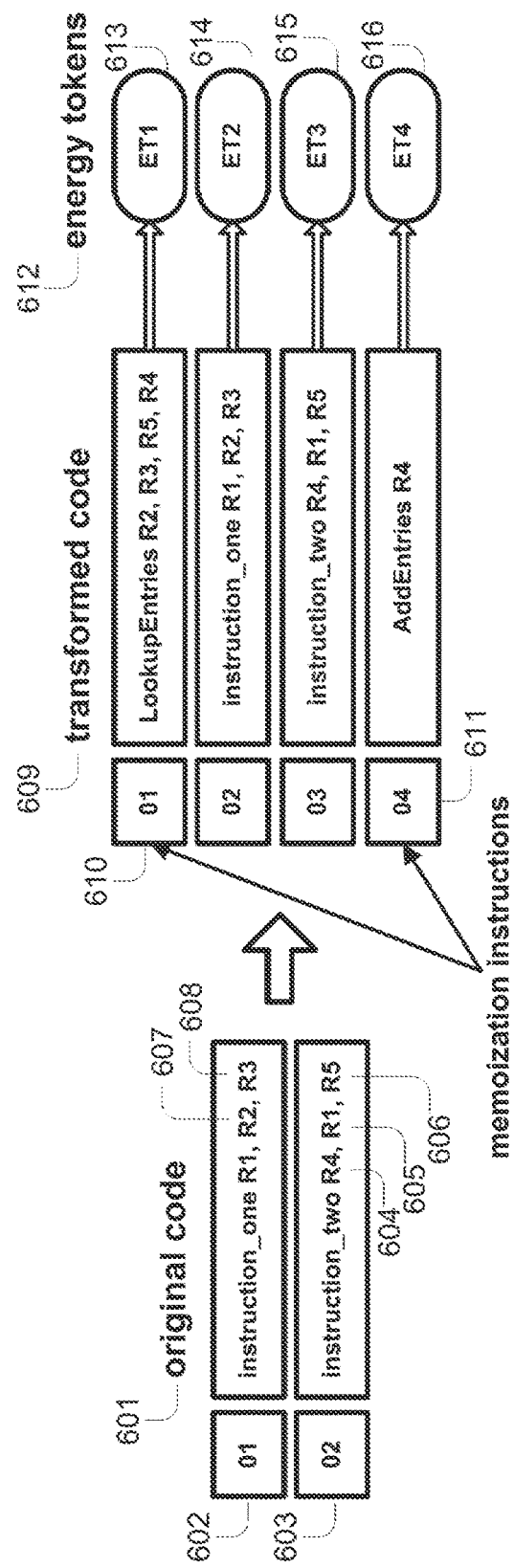
FIG. 6 illustrates an exemplary operation of the memoization instructions and the associated method to insert the instructions in the code of a software program.

FIG. 6 illustrates an exemplary method to insert the memoization instructions in the software code of a target computer program. The purpose of the exemplary method is to increase the payback, measured in terms of electrical power savings, from utilizing the disclosed memoization technique and the associated VCFU.

FIG. 6 shows an embodiment of a potentially skipped code segment (PSCS) 601 including two instructions tagged as 602 and 603. In each instruction, there are three register operands. The two rightmost register operands, e.g., the register operands 605 and 606 in instruction 603 or the register operands 607 and 608 in instruction 602, denote the input or source registers and the leftmost register operand, e.g., the register operand 604 in instruction 603, denote the output or destination registers.

As it can be understood by those skilled in the art, the PSCS includes three input parameters 606, 607, and 608, one output parameter 604, and one register 605 intended to hold the intermediate output result produced by the first instruction 602. In the context of the specific example, register 605 may be considered as a temporary register that may be located in the temporary register file of a shading processor. The illustration tagged as 609 depicts a potential transformation of the PSCS which is in accordance to the present disclosure. The memoization decorations in 609 are inserted at the beginning, before instruction 602, and at the end, after instruction 603, of the PSCS. Those value cache management instructions are intended to perform the memoization operation, that is, to exploit value redundancy, and bypass the instructions of the PSCS, if such bypass operation will lead to electrical power savings.

In accordance to the illustrated transformed code 609, prior to the execution of the particular PSCS of FIG. 6, the value cache storage area is first checked via the LookupEntries instruction 610. The operands of the LookupEntries instruction are the input registers and output registers of the evaluated PSCS. More specifically, the input registers are denoted by the three leftmost instruction operands, i.e., R2, R3, and R5, and the output register is denoted by the rightmost instruction operand, i.e., R4.

When the invented VCFU receives the given set of input parameters, during the LookupEntries instruction execution, the value cache storage area, part of VCFU, is checked to find out if the output result is located in this area. If this is the case, i.e., a hit occurs in value cache, the output results are immediately retrieved from value cache. At this point, the VCFU is responsible to forward the retrieved results to the corresponding output register i.e., to register R4 in the context of the discussed example. If the output results for the given set of input parameters does not exist in value cache, the output results are calculated, as it will normally happen in a system without the technology provided herein, and, finally, the output results are stored in the value cache for future uses via the AddEntries instruction 611. As it can be understood, the AddEntries instruction as well as the instructions comprising the PSCS are executed only during a value cache miss.

As it can be recognized by those skilled in the art, in case of a value cache hit, the ordering of the to-be-executed instructions of the target software code must be accordingly modified. In this case, the VCFU is responsible thereof to inform the processor fetch stage (which is typically controlled by the processor PC) that a dynamic branching in the fragment shader code must be immediately performed. In an embodiment of the present invention, the value cache storage area contains an extra field which includes this information, i.e., the step that must be performed in the target software code.

In the context of the discussed example, this step is equal to the number of instructions included in the PSCS. Thereby, in case of a hit, the VCFU must output not only the output results, but also the number of PSCS instructions. The resulting number of PSCS instructions is forwarded to processor PC by the VCFU, so as the dynamic branching in the software code will be performed. The number of PSCS instructions is stored in the value cache when the AddEntries instruction is executed for the first time. Those skilled in the art will appreciate that the VCFU may operate similarly to a conventional branch prediction unit which typically exists in some processors, but typically such a unit is absent in processors or processing units intended to process graphics data.

Figure 7:
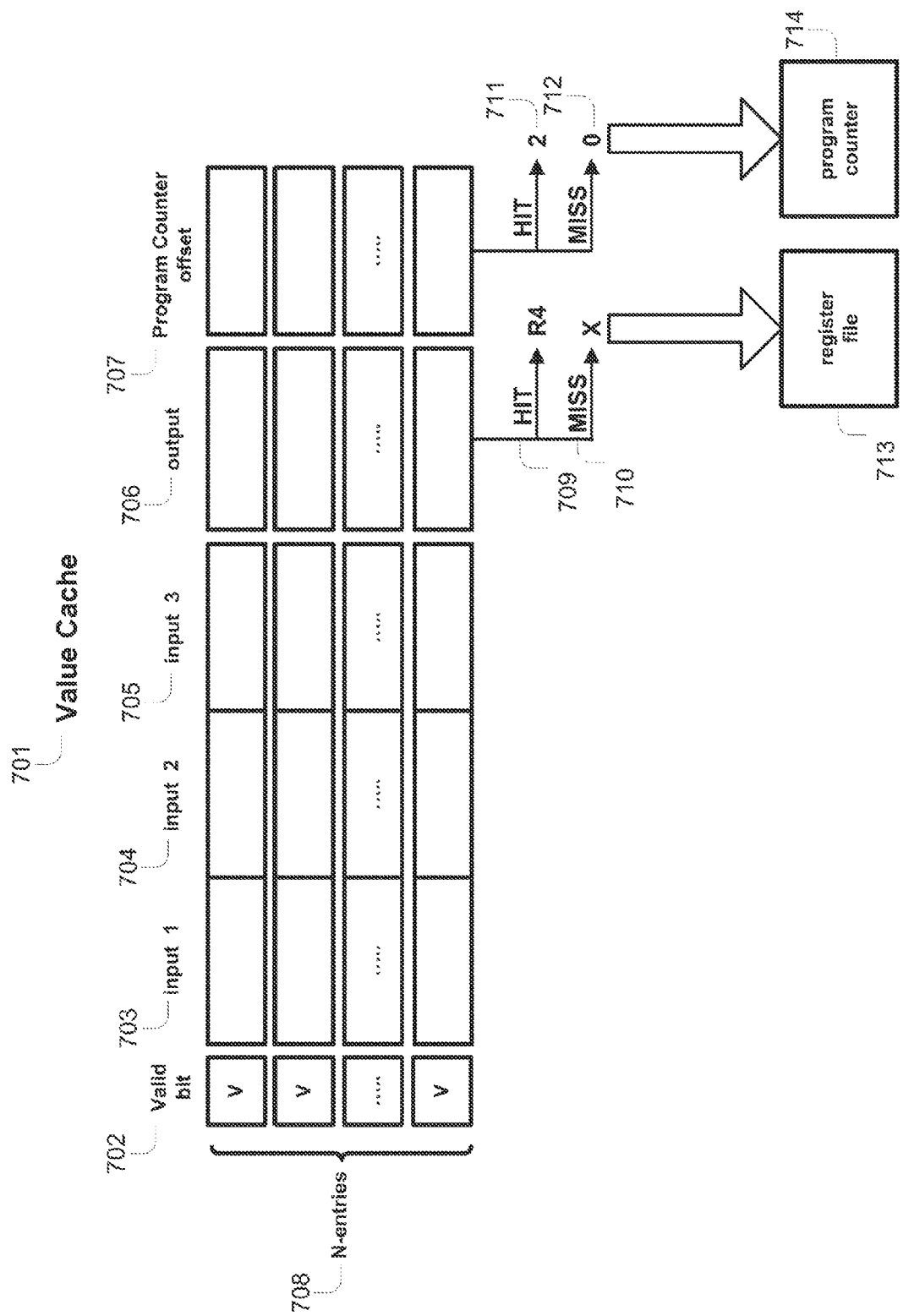
FIG. 7 illustrates a block diagram of an exemplary embodiment of the value cache functional unit.

FIG. 7 depicts a block diagram of an embodiment of the value cache storage area, part of VCFU, which is in accordance to the exemplary PSCS illustrated in FIG. 6. The value cache arrangement 701 includes several entries 708 and each entry is decomposed into several fields. A valid bit 702 is attached to each value cache entry to indicate which entries contain valid data. The arrangement of FIG. 7 is appropriately configured to support the execution of the memoization instructions depicted in FIG. 6.

The locations in the illustrated value cache tagged as 703, 704, 705 are intended to hold arithmetic values that will participate in the value cache matching process. During the execution of the LookupEntries instruction 610, the arithmetic values stored in R2, R3, and R5 registers will be forwarded to value cache, i.e., those three values will act as a key to search the value cache storage area. For example, the arithmetic value initially stored in R2 register may be compared against the arithmetic value stored in field 703. Similarly, the arithmetic value initially stored in R3 register may be compared against the arithmetic value stored in field 704, and the arithmetic value initially stored in R5 register may be compared against the arithmetic value stored in field 705.

The circuit logic of the value cache, not shown in FIG. 7, must operate to instrument the comparisons. If the three comparisons indicate a match, the arithmetic values stored in the corresponding input registers and the arithmetic values stored in the corresponding value cache input locations are equal, a value cache hit signal is issued; otherwise a value cache miss signal is issued.

In an embodiment of the present disclosure, the value cache circuit logic may not contain additional logic to encode and direct the comparison process to take into account the transformation and the accuracy fields that may exist in the LookupEntries instruction. In an another exemplary embodiment, the value cache circuit logic may contain additional logic to encode and direct the comparison process to take into account the transformation 507 and the accuracy fields 508 that may exist in the LookupEntries instruction.

After the comparison process is finalized, appropriate actions must take place based on the result of the comparison. In case of a value cache hit, the arithmetic value stored in the value cache output field 706 of the matching value cache entry is read and forwarded to the corresponding register 709 (R4 in the context of the discussed example) of the corresponding register file 713 which may be either the temporary or the output register file of a shading processor. In parallel, the immediate value stored in the program counter offset field 707 of the matching value cache entry must be also read 711 and forwarded in the processor program counter 714, so as the processor control flow logic can bypass the execution of the PSCS.

If case of a value cache miss, the output result must be calculated as it will normally happen in a system without the technology provided herein, hence no write transactions 710 will be performed in the temporary or output register file by VCFU and the VCFU must also notify the processor control flow logic 712 that no instruction bypassing actions will be performed.

As it can be recognized by those skilled in the art, the benefits of the disclosed memoization mechanism may be threefold. First and most importantly, in case of a value cache hit, the instructions consisting the PSCS will be bypassed (not executed) which may lead to performance improvements and/or electrical power savings. Second, some temporary registers (register R1 in the context of the discussed PSCS) may not be accessed which may also lead to performance improvements and/or electrical power savings. Third, some data dependencies between subsequent instructions, e.g., the read-after-write data dependence between the two instructions of the discussed PSCS, may not have to be evaluated which may also lead to performance improvements and/or electrical power savings.

A critical design parameter of the value cache storage area is the number of value cache entries. In general, by increasing the number of value cache entries, the possibility to experience a value cache hit is also increased, but the electrical power consumption and the latency of the value cache is also increased.

The inventors have recognized that a relatively limited number of entries is required in the value cache. However, as it can be understood by those skilled in art, the exact number of entries is a subject under optimization, e.g., via profiling, and should be identified after considering various parameters such as, but not limited, to the occurrences of the value cache hits and how the number of value cache hits changes when the value cache entries are increased, the electrical power consumed by the value cache, and the electrical power consumed during the execution of the PSCS.

The inventors want to clarify that the specific arrangement illustrated in FIG. 7 is not only applicable for the PSCS shown in FIG. 6, but it can be used, as it is, for all the PSCS that have three input parameters and one output register, or two input parameters and one output register, or one input parameter and one output register.

According to the fourth aspect of the technology disclosed in this invention, a target software program may be analyzed to determine all PSCS that have the same or smaller number of input parameters and one output parameter with the discussed PSCS. In an embodiment of the present disclosure, the analysis may be performed by traversing the control flow graph of a target software program in order to identify groups of instructions (i.e., PSCS) with three input parameters and one output register, or two input parameters and one output register, or one input parameter and one output register.

Those skilled in the art will recognize that it is desirable the sought groups of instructions to include the maximum possible number of machine level instructions, so as the benefits of the value reuse mechanism will be maximized. Thus, in the exemplary case of the value cache organization illustrated in FIG. 7, the desired groups of instructions must adhere to two conditions. First, the number of the input and output parameter must be as discussed and the sought groups of instructions must include the maximum possible number of machine level instructions. The inventors have recognized that the process to identify PSCS is straightforward and relatively simple, e.g., it is not time or memory consuming process, which may be considered as an additional benefit of the technology provided in the present invention.

In another embodiment, the analysis may be performed by traversing an intermediate representation or any kind of flow representation of a target software computer program. In a yet another embodiment, the analysis may be performed statically. Static analysis may be done during the compilation of a software program or by any kind of tool or tools that may analyze a representation of a software program prior to execution. In a yet another embodiment, the analysis may be performed dynamically in a just in time or instrumented environment in which a just in time compiler may take into account the two conditions and accordingly modify the intermediate or executable program code at run-time.

As it can be recognized by those skilled in the art, the invented VCFU may add time and electrical power consumption overheads. The overheads may include testing and retrieving the results from the value cache prior to executing the target PSCS (during the execution of LookupEntries instruction) plus the overheads of storing the results (during the execution of AddEntries instruction). Namely, the potential benefits of the proposed VCFU not only depend on the number of eliminated PSCS instances, but, inter alia, on the time and electrical power spent in detecting the instances to be eliminated and updating the value cache storage area.

According to the fifth aspect of the technology discussed herein, a methodology to optimize the usage of memoization process is disclosed. The target of the proposed methodology is to maximize the electrical power savings provided by memoization. However, those skilled in art will recognize that the proposed methodology is more generally applicable and may be used, for example, to maximize the performance improvements of memoization.

In the context of the exemplary illustration of FIG. 6, each machine level instruction is assigned with a particular energy token 612, that is the amount of energy spent by a target processing unit during the execution of the machine level instruction. The energy tokens may be measured by a real measurement system, for example a wattmeter, or may be estimated by a suitable power simulator, that is, any kind of software program that can estimate the energy consumed by a target processor. Furthermore, the energy tokens may be expressed using any suitable energy unit, e.g., nanojoules, or as a relative number, e.g., as a number normalized to the energy consumed by another machine level operation.

The inventors want to clarify that the disclosed method is independent on the way that the per-instruction energy tokens have been calculated and/or expressed and the present application intends to include all the equivalent or alternative ways for measuring and expressing the energy consumed by a machine level instruction of a target software program.

As illustrated in FIG. 6, every instruction including the discussed PSCS 602, 603, and the memoization instructions 610, 611 are associated by a measured or calculated energy token. In case of a value cache hit, only the energy token (ET1) 613 will be consumed by a target processor, i.e., the subsequent three instructions will be bypassed. In case of a value cache miss, the total energy consumed by a target processor will be defined by the addition of all the energy tokens depicted in FIG. 6, that is: ET1 613 plus ET2 614 plus ET3 615 ET4 616.

Afterwards, a threshold, termed as TH hereafter, may be determined to indicate under which conditions the value cache mechanism can reduce the electrical power consumption for the discussed PSCS 601. In an exemplary embodiment, the threshold may be defined as the number of the value cache hits divided by the number of value cache accesses, also known as cache hit ratio; however other arrangements are also possible. It is to be understood that the number of value cache accesses is equal to the number of times the PSCS would be executed without utilizing the technology disclosed in this invention.

Those skilled in the art will recognize that the number of value cache hits is a function of a target software program and/or the form of the under processing 3-D graphics data. Higher value cache hit ratios may lead to higher electrical power savings whereas lower value cache hit ratios may indicate that the discussed value reuse mechanism is not beneficial for a PSCS.

According to the discussed methodology, the next step may be to determine a threshold TH above which the disclosed memoization mechanism is beneficial for the exemplary PSCS illustrated in FIG. 6. An embodiment of this process may be as follows:

Energy without memoization (EWOUT): ET2+ET3

Energy with memoization (EW): TH*ET1+(1−TH)*(ET1+ET2+ET3+ET4)

Obviously, what is desirable is the following:

EW<EWOUT which may be transformed as:

$$TH > (ET1+ET4)/(ET2+ET3+ET4) \quad (1)$$

For example, if, for illustration purposes, we assume that:
ET1=4 power units
ET2=3 power units
ET3=3 power units
ET4=2 power units
then $$TH > 0.75 \quad (2)$$

The above example indicates that for a value cache hit ratio greater than 0.75, as defined by inequality (2), the disclosed memoization mechanism is able to provide electrical power savings, when the PSCS is executed, compared to the case in which the technology provided in this invention is not utilized. Obviously, the higher the value cache hit ratio (as long as it is higher than 0.75), the higher the electrical power savings.

The inventors want to state that the inequality (1) may not be valid for a set of energy tokens. Differently stated, the inequality (1) may lead to TH above 1 which is obviously non applicable, since the TH must be, by definition, below or equal to 1. This may happen when the PSCS includes relatively simple instructions, i.e., instructions which consume a small amount of energy when executed. This behavior also indicates that the disclosed memoization mechanism is particularly applicable to PSCS comprising of relatively complex and energy consuming instructions, such as vector calculations, multiple-add operations, square-root calculations, reciprocals etc.

The inventors want also to state that the process of calculating the threshold TH is a relatively simple process, requiring only few additions and one division, which may be considered as an additional benefit of the technology provided herein.

According to the sixth aspect of the present disclosure, this invention provides a number of embodiments to assess the paybacks, measured in terms of electrical power savings, reported by each identified PSCS, when employing the proposed memoization mechanism.

According to an embodiment, each identified PSCS may be analyzed statically via profiling. For example, a target software program may be executed in an instrumented environment under many different loads while collecting the value cache hit ratios of each identified PSCS. The collected hit ratios may be compared against the calculated thresholds TH of each identified PSCS. The results of the comparisons may be analyzed to select the particular code segments that may benefit from employing the invented mechanism.

The selection process may also favor PSCS that provide the highest paybacks in terms of electrical power savings. A target software program may be recompiled or decompiled and recompiled again to limit the memoization instructions only to the selected PSCS. The loads may include representative loads, benchmarking loads, loads from prior executions, or even randomly selected or randomly generated loads. The analysis of the identified PSCS may be performed en masse or by examining one or more identified PSCS in each profiling run.

In another particularly preferred embodiment, each identified PSCS may be analyzed dynamically during the normal execution of a target software program. For example, a just in time instrumented environment may be employed to trace the behavior of each PSCS and determine if a particular PSCS may benefit from the proposed memoization mechanism. If a particular PSCS or many PSCS are proved to be beneficial for employing the proposed mechanism, then a just in time compiler may be invoked to insert the value cache management instructions in the appropriate points of the executable or intermediate code of a running software program.

The selection process may again favor PSCS that provide the highest paybacks in terms of electrical power savings. The analysis of the identified PSCS may be performed en masse or by testing one or more identified PSCS at a time. In the particular embodiment, the performance of the running software program may be very poor during the instrumented execution. In such a case, the instrumented execution may be performed in time intervals followed by time intervals of non-instrumented execution and so on do forth. Alternatively, the instrumented execution may be performed only for a small time period in the beginning of code execution; the time period may be termed as a training phase.

Figure 8:
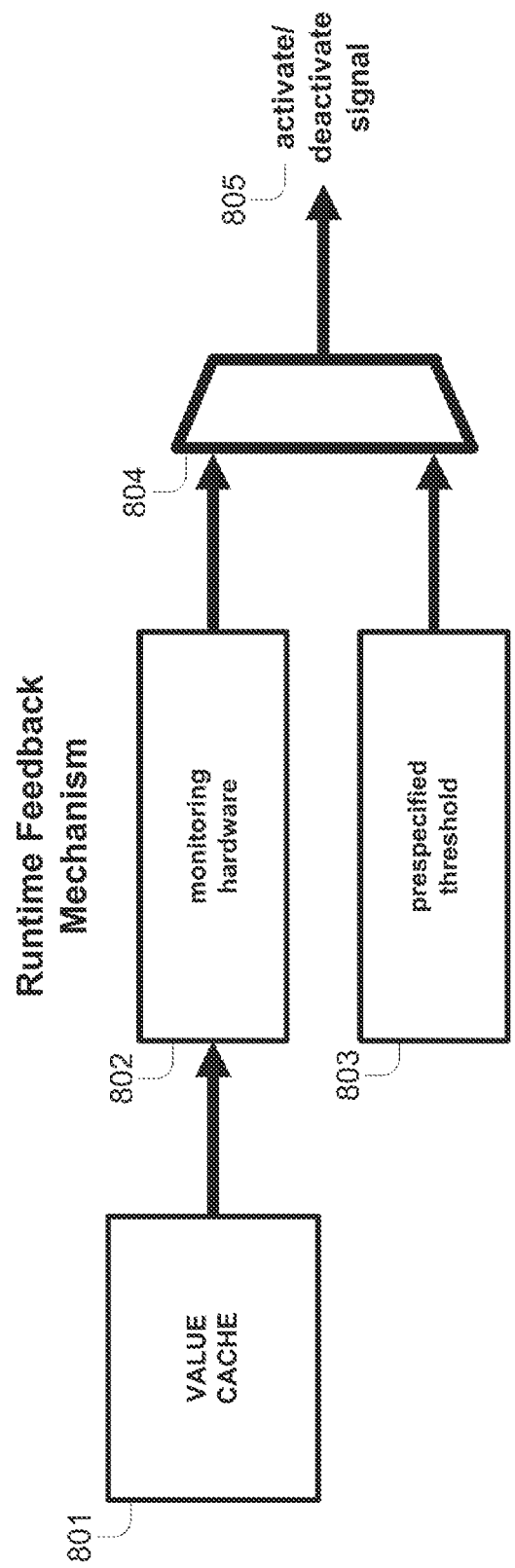
FIG. 8 illustrates a hardware configuration of a run-time value cache feedback mechanism.

In another embodiment which is in accordance to the illustration depicted in FIG. 8, the behavior of each identified PSCS may be tracked dynamically during the normal execution of a target software program by a hardware circuit. A block diagram of the circuit is presented in FIG. 8. A dedicated hardware module 802 may observe the run-time value cache hit ratio 801 when the value cache storage area is used by one or more identified PSCS. The collected hit ratio or hit ratios may be compared by a comparison circuit 804 against the calculated thresholds TH of the monitored PSCS. The calculated thresholds TH may be stored in a special purpose or scratch register 803. The special purpose or scratch register may be a programmer visible register or a configuration register.

In a specific embodiment, the results of comparison process 805 may be used to deactivate or power-down the memoization mechanism for one or more PSCS that are not proved beneficial for employing the proposed mechanism. In another embodiment, the results of the comparison may set a signal to trigger and invoke a just-in-time compiler to remove the memoization decorations from the software code of a running software program.

Again, the analysis of the identified PSCS may be performed en masse or by monitoring one or more identified PSCS at a time. The monitored PSCS may be a set of PSCS that provide the highest paybacks in terms of electrical power savings. The operation of the monitoring hardware may be performed in time intervals followed by time intervals of non-monitored execution and so on do forth. Alternatively, the monitored execution may be performed only for a small time period in the beginning of the code execution; again the small time period may be termed as a training phase.

Those skilled in the art will recognize that the discussed PSCS shown in FIG. 6 and the corresponding arrangement of the value cache shown in FIG. 7 have been chosen only for illustration and description purposes. Other value cache arrangements are also possible to be employed and the present invention intends to encompass all alternative arrangements, such as a value cache with a smaller or larger number of input parameters, and/or a value cache with larger number of output result fields, and/or PSCS consisting of smaller or larger number of machine-level instructions.

For example, a value cache arrangement may be used which may support four input parameters and four output fields. The inventors want to clarify that even with such value cache arrangement, the instruction code shown in FIG. 6 may be considered as a PSCS, although the particular PSCS contains fewer input and output parameters. In such a case, the unused value cache fields may be powered down (the corresponding energy tokens of the memoization instructions may be accordingly modified), so as a reduction in the electrical power consumed by the value cache may be achieved.

EXAMPLE 2

Figure 9:
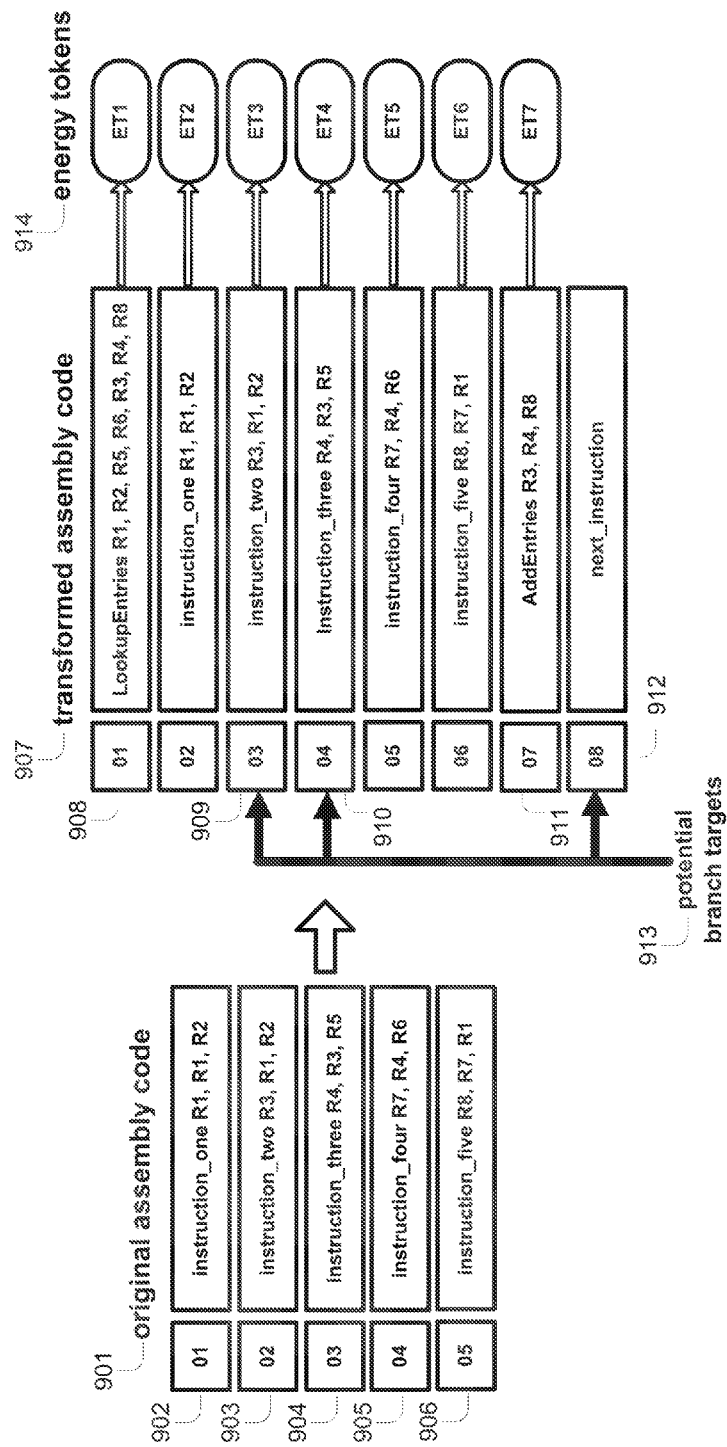
FIG. 9 illustrates a second exemplary operation of the memoization instructions and the associated method to insert the instructions in the code of a software program.

FIG. 9 illustrates another exemplary operation of memoization instructions. The purpose of the second example is to introduce an alternative usage of VCFU which is in accordance to the seventh aspect of the technology disclosed in the present application. Similar to the previous example, an exemplary method to insert the memoization instructions will be discussed. Again, the purpose of the discussed aspect is to increase the payback, measured in terms of electrical power savings from utilizing the disclosed memoization technique and the associated VCFU.

FIG. 9 shows an embodiment of a PSCS 901 including five instructions tagged as 902, 903, 904, 905, and 906. The instruction format is similar to the previous example. Those skilled in the art will recognize that the PSCS includes four input parameters indicated by R1, R2, R5, and R6 registers and one output parameter indicated by R8 register. All other registers illustrated in the discussed PSCS are intended to hold the intermediate results and may be considered as temporary registers that may be located in the temporary register file of a shading processor; the registers will be termed as intermediate registers hereafter.

The illustration tagged as 907 depicts a potential transformation of the PSCS. Similarly to the previous example, the memoization decorations in 907 are inserted at the beginning, before instruction 902, and at the end, after instruction 906, of the PSCS. Those memoization decorations are intended to perform the value reuse operation targeting to bypass one or more instructions of the PSCS, if such bypass operation will lead to electrical power savings.

Unlike the previous example and in accordance to the seventh aspect of the technology discussed herein, the memoization instructions may include not only the input and the output parameters, but also some intermediate registers; R3 and R4 registers in the context of the specific example.

In accordance to the illustrated transformed code 907, prior to the execution of the particular PSCS, the value cache storage area is first checked via the LookupEntries instruction 908. The operands of the LookupEntries instruction are the input registers, output registers, and two intermediate registers of the evaluated PSCS. More specifically, the input registers are denoted by the four leftmost instruction operands, i.e., R1, R2, R5, and R6, the output register is denoted by the rightmost instruction operand, i.e., R8, whereas the intermediate registers are denoted by R3 and R4 registers.

When the VCFU receives the given set of input parameters, the value cache storage area is checked to find out if the output results are located in this area, as it is already explained in the previous example. However, a main difference herein is that one out of three types of value cache hits may occur. The type of value cache hit may be defined by the comparison process between the input parameters and the arithmetic values stored in value cache. The type of value cache hit will also define the output register in which the data retrieved by the value cache should be forwarded.

It can be understood that in case of a value cache miss, the output results must be recalculated, as it will normally happen in a system without the technology provided herein, and, finally, the output results may be stored in the value cache for future uses via the AddEntries instruction 911. A distinction point herein, compared to the previous example, is that the AddEntries instruction may also store in the value cache the arithmetic values of the intermediate registers.

As it will be recognized by those skilled in the art, the type of value cache hit may also define the ordering of the to-be-executed instructions of a target software code. Another distinction point herein is that different branches in the target software code may occur based on the type of value cache hit.

Figure 10:
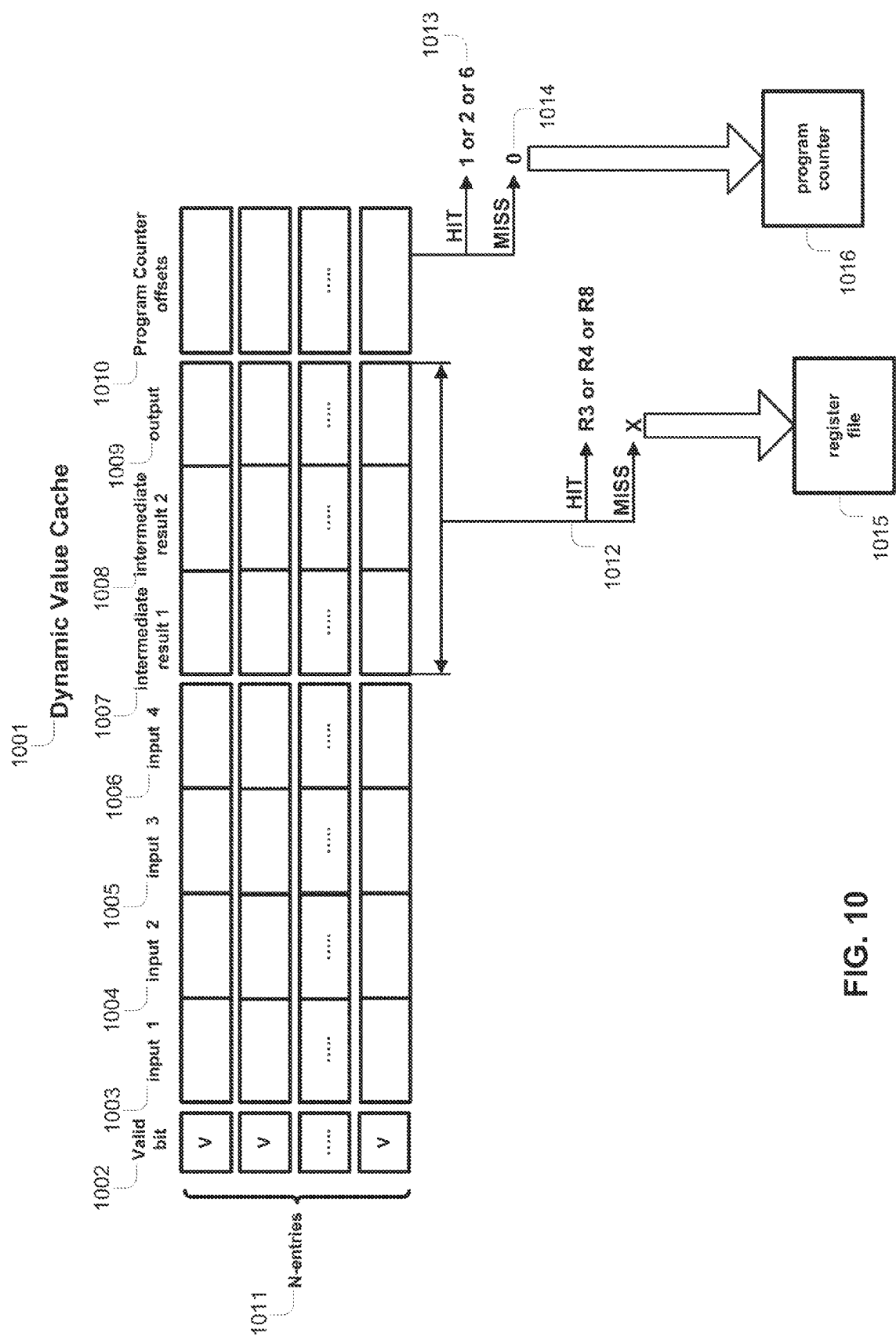
FIG. 10 illustrates a block diagram of a general embodiment of a value cache.

FIG. 10 depicts a block diagram of an embodiment of a value cache storage area, termed as dynamic value cache hereafter, which is in accordance to the exemplary PSCS illustrated in FIG. 9. The presented value cache arrangement 1001 includes several entries 1011 and each entry is decomposed into several fields. Again, a valid bit 1002 is attached to each entry of the dynamic value cache to indicate which entries contain valid data. The arrangement of FIG. 10 is appropriately configured to support the execution of the memoization decorations depicted in FIG. 9.

The locations, in the illustrated dynamic value cache, tagged as 1003, 1004, 1005, and 1006 are intended to hold arithmetic values that will participate in the value cache matching process. During the execution of the LookupEntries instruction 908, the arithmetic values stored in R1, R2, R5, and R6 registers will be forwarded to VCFU; those four values will act as a key to search the value cache storage area. The arithmetic value initially stored in R1 register may be compared against the arithmetic value stored in field 1003. Similarly, the arithmetic value initially stored in R2 register may be compared against the arithmetic value stored in field 1004, the arithmetic value initially stored in R5 register may be compared against the arithmetic value stored in field 1005, and the arithmetic value initially stored in R6 register may be compared against the arithmetic value stored in field 1006.

The circuit logic of dynamic value cache (not shown in FIG. 10) must operate to instrument the comparisons. The results of the four comparisons, i.e., the number of matches, may define the type of value cache hit or indicate that a value cache miss occurred.

In an embodiment of the present invention, the value cache circuit logic may not contain additional logic to encode and direct the comparison process to take into account the transformation and the accuracy fields that may exist in LookupEntries instruction. In another embodiment, the value cache circuit logic may contain additional logic to encode and direct the comparison process to take into account the transformation and the accuracy fields that may exist in the LookupEntries instruction.

In the context of the discussed PSCS shown in FIG. 9, some desired types of value cache hits may be as follows:
Type 1: matches occurred in all input parameters i.e., R1, R2, R5, R6.
Type 2: matches occurred in three leftmost input parameters i.e., R1, R2, R5.
Type 3: matches occurred in two leftmost input parameters i.e., R1, R2.

After the comparison process is finalized, appropriate actions may take place based on the result of the comparison process. In case of a value cache hit, the type of the value cache hit may also be identified. In a type 1 hit, the arithmetic value stored in value cache output field 1009 of the matching value cache entry is read and forwarded to the corresponding register 1012, R8 in the context of the discussed example, of the corresponding register file 1015. In a type 2 hit, the arithmetic value stored in value cache intermediate result 1008 of the matching value cache entry is read and forwarded to the corresponding register, R4 in the context of the discussed example, of the corresponding register file 1015. In a type 3 hit, the arithmetic value stored in value cache intermediate result field 1007 of the matching value cache entry is read and forwarded to the corresponding register, R3 in the context of the discussed example, of the corresponding register file 1015.

In parallel to the above process and based on the type of the observed value cache hit, the value cache program counter offsets 1010 of the matching value cache entry may be also read 1013 and the processor PC 1016 may be accordingly updated, so as the processor control flow logic can bypass the execution of the discussed PSCS or some instructions of the discussed PSCS.

In case of a type 1 hit, the arithmetic value "6" may be forwarded to the processor PC; next to-be-executed instruction will be instruction 912. In case of a type 2 hit, the arithmetic value "2" may be forwarded to the processor PC; next to-be-executed instruction will be instruction 910. In case of a type 3 hit, the arithmetic value "1" may be forwarded to the processor PC; next to-be-executed instruction will be instruction 909. The possible branch targets, in the context of the discussed example are illustrated in FIG. 9 by thick arrows 913.

As it can be recognized by those skilled in the art, larger branches, i.e., forward steps, in the code of a software program are desirable, since larger branches will lead to larger number of eliminated, not executed, instructions, hence to higher electrical power savings.

To the contrary, in case of a value cache miss, all the instructions comprising the PSCS must be executed, as it will normally happen in a system without the technology provided herein. In such a case, the VCFU must also notify the processor control flow logic 1014 that no instruction bypassing actions will be performed.

Again, a critical design parameter of the value cache storage area is the number of value cache entries. The applicants have recognized that, even in the case of dynamic value cache, a relatively limited number of entries is required. However, as it can be understood by those skilled in art, the exact number of entries is a subject under optimization, e.g., via profiling, and should be identified after considering various parameters such as, but not limited, to the occurrences and types of the value cache hits, the electrical power consumed by the value cache, and the electric power consumed by the PSCS.

The applicants want to clarify that the arrangement illustrated in FIG. 10 is not only applicable for the PSCS shown in FIG. 9, but it can be used, as it is, for all the PSCS that have the same or smaller number of input parameters, the same or smaller number of intermediate results, and the same or smaller number of output parameters.

Similarly to the previous example, a target software program may be analyzed to determine all the PSCS that have the same or smaller number of input, intermediate result, and output parameters with the discussed PSCS. In a preferred embodiment, this analysis may be performed by traversing the control flow graph of a target software program in order to identify groups of instructions, i.e., PSCS, with the number of parameters. Those skilled in the art will recognize that it is desirable the sought groups of instructions to include the maximum possible number of machine level instructions, so as the benefits of the memoization mechanism will be maximized.

Thus, in the case of dynamic value cache arrangement shown in FIG. 10, the desired groups of instructions must adhere to two conditions. First, the number of input, intermediate, and output parameters must be as discussed and the sought PSCS must include the maximum possible number of machine level instructions.

In another embodiment of the present disclosure, the analysis may be performed by traversing an intermediate representation or any kind of flow representation of a target software program. In a yet another embodiment, this analysis may be performed statically. Static analysis may be done during the compilation of a target software program or by any kind of tool or tools that may analyze a representation of the software code prior to execution. In a yet another embodiment, the analysis may be performed dynamically in a just in time or instrumented environment in which a just in time compiler may take into account the two conditions and accordingly modify at run-time the intermediate or executable code of a target software program.

As it can be recognized by those skilled in the art, the invented dynamic VCFU may add time and electrical power consumption overheads. The overheads may include testing and retrieving the results from value cache prior to executing the target PSCS (during the execution of LookupEntries instruction) plus the overheads of storing the results (during the execution of AddEntries instruction). Namely, the potential benefits of the proposed VCFU not only depend on the number of instruction instances it has eliminated, but, inter alia, on the time and electrical power spent in detecting the instances to be eliminated and updating the value cache storage area.

Similarly to the previous example, each machine level instruction of the discussed example is assigned with a particular energy token 914. The energy tokens may be collected and expressed in any suitable way as discussed in the description of the previous example. The inventors want again to clarify that the disclosed technique is independent on the way by which the per-instruction energy tokens have been calculated and/or expressed and the present application intends to include all equivalent or alternative ways for measuring and expressing the energy consumed by the machine level instructions of a target software program.

As illustrated in FIG. 9, every instruction consisting the discussed PSCS and the memoization instructions are associated by a measured or calculated energy token. In case of a type 1 value cache hit, only the energy token (ET1) will be consumed by the target processor; the subsequent six instructions will be bypassed or not executed. In case of a type 2 value cache hit, the total energy consumed by the target processor will be defined by the addition of the following energy tokens: ET1 plus ET4 plus ET5 plus ET6 plus ET7. In case of a type 3 value cache hit, the total energy consumed by the target shading processor will be defined by the addition of the following energy tokens: ET1 plus ET3 plus ET4 plus ET5 plus ET6 plus ET7.

In case of a value cache miss, the total energy consumed by the target shading processor will be defined by the addition of all the energy tokens depicted in FIG. 9. That is: ET1 plus ET2 plus ET3 plus ET4 plus ET5 plus ET6 plus ET7.

After determining the additive energy tokens for each possible branching operation in the discussed PSCS, that is, the additive energy tokens for a type 1 hit, for a type 2 hit, for a type 3 hit, and for a miss, the next steps may be to calculate specific threshold values. The threshold values will indicate under which conditions the proposed value cache mechanism can reduce the electrical power consumption for the discussed PSCS. However, a main difference with the previous example is that three threshold values must be determined: one threshold value for each discussed branching operation.

The inventors want to state that the process of calculating the three thresholds and extract the corresponding inequalities is fairly similar to the process discussed in the description of the previous example, so it is omitted, since it is not considered necessary to a complete understanding of the present dynamic value cache.

Furthermore, the inventors want also to state that the methods and apparatus for assessing the paybacks reported by each identified PSCS when employing the disclosed dynamic value reuse mechanism are also fairly similar to the methods and apparatus discussed in the description of the previous example, so it is also omitted, since it is not considered necessary to a complete understanding of the present dynamic value cache.

In addition, the inventors want also to state that those skilled in the art will recognize that the PSCS shown in FIG. 9 and the corresponding arrangement of the dynamic value cache shown in FIG. 10 have been chosen only for illustration and description purposes. Other dynamic value cache arrangements are also possible to be employed and the present application intends to encompass all the alternative arrangements, such as a dynamic value cache with a smaller or larger number of input parameters, or a dynamic value cache with a smaller or larger number of intermediate parameters, and/or a dynamic value cache with larger number of output results, and/or an identified PSCS consisting of smaller or a larger number of machine-level instructions.

According to the eighth aspect of the technology discussed herein, the quality of the results generated by approximate memoizations may be tracked and dynamically controlled by a hardware circuitry. That is, the hardware circuitry may dynamically increase or decrease the precision of the input parameters during the process of matching the input parameters to the arguments stored in value cache when executing of one or more code segments of a particular software program.

Figure 11:
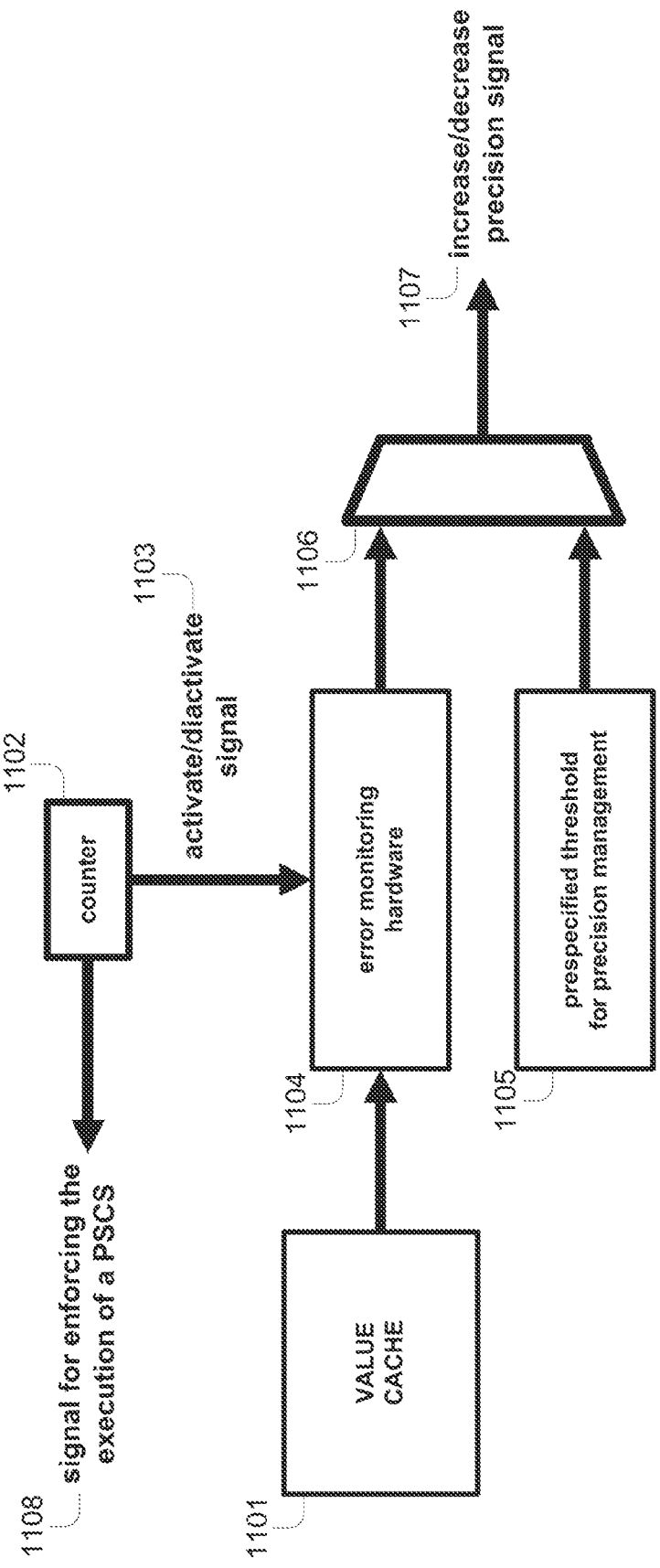
FIG. 11 illustrates a hardware configuration of another run-time value cache feedback mechanism that contains means for monitoring the errors generated by approximate memoizations.

FIG. 11 illustrates an embodiment of the hardware circuitry which is in accordance to one or more aspects of the present invention. A dedicated hardware module 1104 may track at run-time the behavior of one or more identified PSCS and consequently minimize the errors in the output results produced by the approximate memoization operations.

The collected errors, if any, may be compared by a comparison circuit 1106 against a prespecified threshold ETH. The threshold may be stored in a special purpose or scratch register 1105 that may be a programmer visible register or a configuration register. In accordance to an embodiment of the present invention, the prespecified threshold ETH may be set by a user prior to execution of a target software program and the threshold ETH may be the same across all identified PSCS. In another embodiment, the threshold ETH may be different across the identified PSCS, e.g., different threshold values may be employed in PSCS belonging to fragment or vertex shaders of a graphics software program or even to the various fragment shaders of a graphics software program based on, for example, if a fragment shader operate on the foreground or the background plane of a rendered scene.

The errors in the output results may be defined by calculating the difference, e.g., via simple arithmetic subtractions, between the output results generated by successful value cache lookups 1101 and the results generated by the normal execution of one or more PSCS in the target fragment shading processor 1108, referred as dual-mode execution hereafter. The next step is to compare the differences against the prespecified threshold ETH and the outcome of the comparisons may indicate if the precision of the input arguments, during the process of matching the input parameters to the arguments stored in value cache, must be increased or decreased 1107.

In case that an identified PSCS has more than one output result, say N output results, then N differences must be calculated across the corresponding output results generated by a successful value cache lookup 1101 and the results generated by the normal execution of the PSCS. As it can be understood, the next step is to perform N comparisons among the calculated differences and the prespecified threshold ETH and, in such a case, a decision to modify the precision of the input parameters 1107 may be taken if M among N comparisons indicate that the differences are smaller than the prespecified threshold ETH, where M is smaller or equal to N.

According to an embodiment of the present disclosure, the increase or decrease in the precision of the input parameters may be conservative, i.e., one unit or bit at a time. In another embodiment, the increase or decrease in the precision of the input parameters may be more aggressive, i.e., multiple units or bits at a time.

The inventors want to clarify that the run-time hardware circuitry illustrated in FIG. 11 may operate in parallel or not to the "approximation limits" defined by the accuracy field of a LookupEntries instruction. In particular and according to an embodiment of the present invention, the arithmetic value embedded in the accuracy field may act as an "initial value" of the precision of the input parameters and the "initial value" may be further modified at run-time by the circuitry of FIG. 11. In another embodiment, the hardware circuitry illustrated in FIG. 11 may operate autonomously and the accuracy field of one or more LookupEntries instructions may be ignored.

Those skilled in the art will recognize that a critical parameter in the operation of the feedback mechanism illustrated in FIG. 11 is the frequency of performing the dual-mode execution. Note that during dual-mode execution, one or more identified PSCS are executing by the fragment shading processor even if the value cache indicates a hit, i.e., the output results are stilled retrieved from the value cache. It is understood that dual-mode execution may significantly reduce the paybacks, in terms of electrical power savings, provided by the disclosed approximate memoization mechanism.

The inventors have recognized that the dual-mode execution may be triggered every n-th executed fragment shading programs without affecting the effectiveness of the run-time mechanism illustrated in FIG. 11. In essence, the value n will define a sampling period. More specifically, value n may be stored to a decrement counter 1102 and this counter may be decreased every time a fragment shading program is executed. When the counter value is set to zero, a signal to activate the error monitoring hardware 1103 and another signal to enforce the execution of one or more PSCS of a fragment shading program by the target processor 1108 are triggered. After this step, the counter is re-initialed to value n and the whole process is repeated and so on.

The inventors want to state that the process of calculating the exact value of n is fairly similar to the process discussed in the description of the previous examples, so it is omitted, since it is not considered necessary to a complete understanding of the present invention.

In addition, the inventors want also to state that the threshold ETH must be carefully set so as, inter alia, to minimize the visual artifacts of the generated color data when approximate memoization operations are allowed to occur. The exact value of threshold ETH is a subject under optimization and must be identified after analyzing various other parameters of the graphics system such as, but not limited, to the depth of the color data produced by the tile rendering process, the electrical power consumed by the processing path of the graphics processor, and/or the effectiveness of the rendering algorithms used by the graphics processor, e.g., anti-aliasing algorithms.

Those skilled in the art will recognize that the description of the operation of the mechanism of FIG. 11 is performed for illustration purposes. Other arrangements of the mechanism are possible to be employed and the present invention intends to encompass all alternative arrangements. For example, the mechanism of FIG. 11 may be triggered in time intervals followed time intervals of non-monitored execution and so on do forth. Alternatively, the mechanism may be triggered only for a small time period in the beginning of the execution of a graphics software program; the small time period may be termed as a training phase.

The inventors want also to clarify that the foregoing description of the subject matter is not intended to be exhaustive or to limit the subject matter to the precise form disclosed, and other modifications and variations may be possible in light of the above teachings. The presented exemplary cases and embodiments were chosen and described in order to best explain the principles of the invention and its practical application to thereby enable others skilled in the art to best utilize the invention in various other embodiments and various modifications as are suited to the particular use contemplated. It is intended that the appended claims be construed to include other alternative embodiments except insofar as limited by the prior art.

What is claimed is:

1. In an instruction set computer, a device, which is part of a processing path of the instruction set computer, to perform memoization to predict results of code segments without executing the code segments, wherein:
   the device receives dedicated machine instructions at a start and end of each of a plurality of code segments;
   the device receives arguments associated with a code segment;
   the device stores one or more groups of N arguments and M results associated with a code segment in a storing area of the device, wherein N and M are positive integers;
   the device stores one or more expected branch offsets associated with a code segment in the storing area;
   the device searches for a set of input parameters within the storing area;
   the device notifies of a hit when the set or part of the set of input parameters matches a set or part of the set of stored arguments associated with a particular one of the plurality of code segments stored in the storing area of the device;
   the device performs the matching of the input parameters to the stored arguments using a reduced precision than that of the input parameters;
   the device returns the results or part of the results associated with the particular one of the plurality of code segments;
   the device alters an instruction flow to branch to one of the one or more expected branch offsets associated with the particular one of the plurality of code segments; and the device updates the storing area when the set of input parameters does not match any of the stored arguments.

2. The device according to claim 1, wherein the dedicated machine instructions contain information to control the reduction of the precision of the input parameters during the matching of the input parameters to the stored arguments.

3. The device according to claim 2, wherein the reduction of the precision of the input parameters during the matching of the input parameters to the stored arguments is the same in all input parameters.

4. The device according to claim 2, wherein the reduction of the precision of the input parameters during the matching of the input parameters to the stored arguments is different across the input parameters.

5. The device according to claim 1, wherein the input parameters are commutative.

6. The device according to claim 1, wherein the input parameters are in a floating point format.

7. The device according to claim 1, wherein the input parameters are in a fixed point format.

8. The device according to claim 1, wherein the input parameters can be transformed to a sign independent format.

9. The device according to claim 1, wherein the one or more expected branch offsets comprises a plurality of branch offsets, and wherein one of the plurality of branch offsets is selected based on the number of the input parameters that matched to the stored arguments and the matching is performed in reduced precision than that of the input parameters.

10. The device according to claim 1, wherein the hits within the storing area are monitored by circuitry and the circuitry is able to enable or disable the device based on the number of hits.

11. The device according to claim 1, wherein an additional circuitry monitors the results returned by the device after a successful lookup within the storing area, calculates if the results are sufficiently similar, based on predefined thresholds, to the results produced if the device is disabled, and the additional circuitry is able modify the precision of the input parameters during the matching of the input parameters to the stored arguments based on the outcome of the calculation.

12. The device according to claim 1, wherein the dedicated machine instructions are included in the instruction set of an instruction set computer.

13. The device according to claim 1, wherein the input parameters are pre-processed before the set or part of the set of the input parameters are matched to a set or part of the set of stored arguments associated with a particular one of the plurality of code segments stored in the storing area.

14. The device according to claim 13, wherein the storing area includes an indication of how the input parameters were pre-processed.

15. In an instruction set computer, a device, which is part of a processing path of the instruction set computer, to perform memoization to predict results of code segments without executing the code segments, the device comprising:
means for receiving dedicated machine instructions at a start and end of each of a plurality of code segments;
means for receiving arguments associated with a code segment;
means for storing one or more groups of N arguments and M results associated with a code segment, wherein N and M are positive integers;
means for storing one or more expected branch offsets associated with a code segment;
means for searching for a set of input parameters within the means for storing;
means for notifying of a hit when the set or part of the set of input parameters matches a set or part of the set of stored arguments associated with a particular one of the plurality of code segments stored in the means for storing;
means for performing the matching of the input parameters to the stored arguments using a reduced precision than that of the input parameters;
means for returning the results or part of the results associated with the particular one of the plurality of code segments;
means for altering an instruction flow to branch to one of the one or more expected branch offsets associated with the particular one of the plurality of code segments; and
means for updating the means for storing when the set of input parameters does not match any of the stored arguments.

16. A value cache method in an instruction set computer, the method comprising:
analyzing computer code and identifying code segments having a specific number of input parameters and a specific number of output results;
inserting dedicated value cache machine instructions at a start and end of each of the identified code segments, wherein the dedicated value cache machine instructions at the end of each of the identified code segments update a value cache;
receiving one of the dedicated value cache machine instructions associated with a particular code segment, the received dedicated value cache machine instructions contains a number of input parameters;
searching the value cache based on the input parameters, wherein the value cache stores one or more arguments, one or more outputs, and one or more branch offsets associated with each of a plurality of code segments;
determining a cache hit when the input parameters match the one or more arguments associated with a particular code segment stored in the value cache, wherein a cache hit can occur even if a reduction in the precision of the input parameters is performed during the matching between the input parameters and the stored one or more arguments;
branching to one of the one or more branch offsets associated with the particular code segment when there is a cache hit; and
executing the particular code segment when there is not a cache hit.

17. The method according to claim 16, wherein the code segment contains one or more arithmetic and/or memory operations.

18. The method according to claim 16, wherein each of the identified code segments contain one or more functions or subroutines and each function and subroutine comprises one or more arithmetic and/or memory operations.

19. The method according to claim 16, wherein the dedicated value cache machine instructions contain information to control the reduction of the precision of the input parameters during the matching of the input parameters to the stored arguments.

20. The method according to claim 16, wherein the dedicated value cache machine instructions are inserted in the computer code by a compiler, or a just-in-time compiler, or an interpreter, or an assembler of an instruction set computing system.

21. The method according to claim 16, wherein the dedicated value cache machine instructions are inserted in the computer code by a programmer or a user of the instruction set computer.

22. The method according to claim 16, wherein the dedicated value cache machine instructions are inserted in the source code of a computer program and the source code is written in a high-level programming language.

23. The method according to claim 16, wherein the dedicated value cache machine instructions are inserted in the executable code of a computer program.

24. The method according to claim 16, wherein the dedicated value cache machine instructions are inserted and removed based on performance criteria.

25. The method according to claim 16, wherein the dedicated value cache machine instructions are inserted and removed based on energy consumption criteria.

26. The method according to claim 16, wherein the dedicated value cache machine instructions are inserted and removed based on user-defined criteria.

27. The method according to claim 16, wherein the dedicated value cache machine instructions are inserted and removed based on an effect on performance of previous execution of each identified code segment.

28. The method according to claim 16, wherein the dedicated value cache machine instructions include an indication of commutativity of input parameters.

29. The method according to claim 16, wherein the input parameters are transformed to a sign independent format.

30. The method according to claim 16, further comprising monitoring results returned upon the cache hit and inserting or removing the dedicated machine instructions based on the outcome of monitoring.

31. The method according to claim 16, further comprising monitoring results returned upon the cache hit and modifying the precision of the input parameters during the matching of the input parameters to the stored arguments based on the outcome of monitoring.

32. The method according to claim 16, wherein the dedicated value cache machine instructions are included in the instruction set of an instruction set computer.

33. The method according to claim 16, further comprising pre-processing the input parameters before the set or part of the set of the input parameters are matched to a set or part of the set of stored arguments associated with a particular one of the plurality of code segments.

* * * * *